(12) United States Patent
Nolcheff et al.

(10) Patent No.: US 11,286,779 B2
(45) Date of Patent: Mar. 29, 2022

(54) CHARACTERISTIC DISTRIBUTION FOR ROTOR BLADE OF BOOSTER ROTOR

(71) Applicant: HONEYWELL INTERNATIONAL INC., Morris Plains, NJ (US)

(72) Inventors: Nick Nolcheff, Chandler, AZ (US); John Repp, Gilbert, AZ (US); Bruce Reynolds, Chandler, AZ (US); John Gunaraj, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/892,145

(22) Filed: Jun. 3, 2020

(65) Prior Publication Data

US 2021/0381380 A1 Dec. 9, 2021

(51) Int. Cl.
*F02C 7/36* (2006.01)
*F01D 5/02* (2006.01)
*F01D 5/30* (2006.01)

(52) U.S. Cl.
CPC .............. *F01D 5/02* (2013.01); *F01D 5/30* (2013.01); *F02C 7/36* (2013.01); *F05D 2220/32* (2013.01); *F05D 2240/24* (2013.01); *F05D 2240/60* (2013.01)

(58) Field of Classification Search
CPC ..... F01D 5/02; F01D 5/30; F02C 7/36; F05D 2220/32; F05D 2240/24; F05D 2240/60
See application file for complete search history.

(56) References Cited

U.S. PATENT DOCUMENTS

| 2,795,394 | A | | 6/1957 | Slivka et al. | |
|---|---|---|---|---|---|
| 2,796,214 | A | | 6/1957 | Stalker | |
| 2,801,790 | A | * | 8/1957 | Doll, Jr. | F04D 29/544 415/210.1 |
| 2,869,820 | A | | 1/1959 | Marchant et al. | |
| 2,952,403 | A | | 9/1960 | Stalker | |
| 5,088,892 | A | * | 2/1992 | Weingold | F01D 5/145 415/193 |
| 6,079,948 | A | * | 6/2000 | Sasaki | F04D 29/324 416/237 |
| 6,312,219 | B1 | * | 11/2001 | Wood | F01D 5/28 415/191 |

(Continued)

FOREIGN PATENT DOCUMENTS

| GB | 692188 A | 6/1953 |
|---|---|---|
| GB | 1332004 A | 10/1973 |

*Primary Examiner* — J. Todd Newton
*Assistant Examiner* — Theodore C Ribadeneyra
(74) *Attorney, Agent, or Firm* — Lorenz & Kopf, LLP

(57) ABSTRACT

A rotor for a turbofan booster section associated with a fan section of a gas turbine engine includes a rotor blade having an airfoil extending from a root to a tip and having a leading edge and a trailing edge. The airfoil has a plurality of chord lines spaced apart in a spanwise direction. Each chord line of the plurality of chords lines is defined between the leading edge and the trailing edge and has a normalized chord value. From the hub, the normalized chord value decreases to a minimum value between about 20% to about 90% span and increases from the minimum value to the tip. The rotor includes a rotor disk coupled to the rotor blade configured to be coupled to the shaft or the fan to rotate with the shaft or the fan, respectively, at the same speed as the shaft and fan.

17 Claims, 11 Drawing Sheets

(56) References Cited

U.S. PATENT DOCUMENTS

| | | | | |
|---|---|---|---|---|
| 6,331,100 B1* | 12/2001 | Liu | | F04D 29/384 |
| | | | | 416/238 |
| 6,899,526 B2* | 5/2005 | Doloresco | | F01D 5/141 |
| | | | | 416/238 |
| 7,419,353 B2* | 9/2008 | Guemmer | | F01D 5/141 |
| | | | | 415/191 |
| 7,476,086 B2 | 1/2009 | Wadia et al. | | |
| 7,946,825 B2 | 5/2011 | Tudor | | |
| 7,967,571 B2 | 6/2011 | Wood et al. | | |
| 8,087,884 B2 | 1/2012 | Wood et al. | | |
| 8,113,786 B2* | 2/2012 | Spracher | | F01D 5/141 |
| | | | | 416/223 R |
| 8,221,065 B2* | 7/2012 | Greim | | F01D 5/141 |
| | | | | 415/192 |
| 8,602,727 B2* | 12/2013 | Bahadur | | F01D 9/041 |
| | | | | 415/192 |
| 9,359,064 B2* | 6/2016 | Murooka | | B64C 11/00 |
| 9,599,064 B2* | 3/2017 | Gallagher | | F01D 5/141 |
| 10,480,323 B2* | 11/2019 | Balzer | | F01D 5/141 |
| 10,480,531 B2* | 11/2019 | Shibata | | F04D 29/681 |
| 10,480,532 B2* | 11/2019 | Pallot | | F04D 29/321 |
| 2003/0215330 A1 | 11/2003 | Haller | | |
| 2008/0131272 A1 | 6/2008 | Wood et al. | | |
| 2008/0152501 A1 | 6/2008 | Greim et al. | | |
| 2008/0226454 A1* | 9/2008 | Decker | | F04D 29/384 |
| | | | | 416/203 |
| 2009/0162204 A1* | 6/2009 | Aggarwala | | F01D 5/141 |
| | | | | 416/204 R |
| 2009/0226322 A1* | 9/2009 | Clemen | | F04D 29/324 |
| | | | | 416/223 A |
| 2010/0054946 A1* | 3/2010 | Orosa | | F04D 29/324 |
| | | | | 416/223 R |
| 2011/0150659 A1* | 6/2011 | Micheli | | F01D 5/141 |
| | | | | 416/223 A |
| 2011/0286850 A1* | 11/2011 | Micheli | | F04D 29/324 |
| | | | | 416/223 R |
| 2012/0243975 A1* | 9/2012 | Breeze-Stringfellow | | |
| | | | | F01D 5/141 |
| | | | | 415/173.1 |
| 2012/0244005 A1* | 9/2012 | Breeze-Stringfellow | | |
| | | | | F04D 29/324 |
| | | | | 416/223 A |
| 2013/0224040 A1* | 8/2013 | Straccia | | F01D 5/141 |
| | | | | 416/242 |
| 2014/0000280 A1* | 1/2014 | Allen-Bradley | | F01D 5/141 |
| | | | | 60/805 |
| 2014/0000281 A1* | 1/2014 | Nash | | F01D 5/141 |
| | | | | 60/805 |
| 2015/0233323 A1 | 8/2015 | Gallagher et al. | | |
| 2015/0345297 A1* | 12/2015 | Neubrand | | F01D 5/148 |
| | | | | 415/115 |
| 2015/0354362 A1* | 12/2015 | Gallagher | | F04D 29/325 |
| | | | | 60/805 |
| 2016/0131028 A1* | 5/2016 | Lauer | | F02C 7/36 |
| | | | | 60/805 |
| 2017/0211584 A1 | 7/2017 | Taguchi et al. | | |
| 2018/0073367 A1 | 3/2018 | Murdoch | | |
| 2019/0017445 A1* | 1/2019 | Adams | | F02C 3/107 |
| 2019/0309681 A1* | 10/2019 | Townes | | F02C 9/16 |
| 2020/0070988 A1* | 3/2020 | Harvey | | F02C 7/36 |
| 2020/0157946 A1 | 5/2020 | Goodhand | | |

* cited by examiner

CHARACTERISTIC DISTRIBUTION FOR ROTOR BLADE OF BOOSTER ROTOR

TECHNICAL FIELD

The present disclosure generally relates to gas turbine engines, and more particularly relates to a booster rotor for a gas turbine engine booster stage having a rotor blade with a characteristic distribution, such as a normalized chord distribution, which results in increased efficiency and stability. In addition, the present disclosure more particularly relates to a rotor blade for a booster rotor with a characteristic distribution, such as a delta inlet blade angle distribution and/or a delta stagger angle distribution, which results in increased efficiency and stability. Further, the present disclosure more particularly relates to a rotor blade for a booster rotor with a characteristic distribution, such as a normalized local maximum thickness distribution, which provides robustness without negatively impacting efficiency.

BACKGROUND

Gas turbine engines may be employed to power various devices. For example, a gas turbine engine may be employed to power a mobile platform, such as an aircraft. Generally, gas turbine engines include systems with fan and compressor axial rotors, which are operable to draw air into the gas turbine engine and increase the static pressure of the gas flowing within the gas turbine engine. For certain applications, it is desirable to provide a compressor system with an increased overall pressure ratio. For these applications, one or more booster stages (or sometimes referred to as T-stages) may be employed that include one or more booster rotors. During operation, the airflow into the booster rotor may experience endwall meridional velocity deficits at a hub or a tip of the booster rotor, or both, which may result in increased aerodynamic loading, instability and inefficiency. In addition, in certain instances, the booster rotor may encounter foreign object(s) during operation. In these instances, the components of the gas turbine engine may be required to continue to operate after this encounter or may be required to shut down safely. Generally, in order to ensure the booster rotor withstands the encounter, an airfoil of the booster rotor may have an increased overall thickness to provide robustness to the airfoil. The increased overall thickness, however, increases the weight of the airfoil, and thus, the booster rotor, which is undesirable for the operation of the gas turbine engine.

Accordingly, it is desirable to provide a rotor, such as a booster rotor for a fan section of a gas turbine engine, which has a characteristic distribution, such as a normalized chord distribution, which promotes stability and improves efficiency of the booster stage in view of the endwall meridional velocity deficits encountered. In addition, it is desirable to provide a rotor, such as a booster rotor for a fan section of a gas turbine engine, which has a characteristic distribution, such as a delta inlet blade angle distribution and/or a delta stagger angle distribution, which improves management of endwall aerodynamic loading that also results in increased efficiency and stability. In addition, it is desirable to provide a rotor, such as a booster rotor for a fan section of a gas turbine engine, which has a characteristic distribution, such as a normalized local maximum thickness distribution, which provides robustness to foreign object encounters without increasing a weight of an airfoil of the booster rotor or negatively impacting efficiency. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a rotor for a turbofan booster section associated with a fan section of a gas turbine engine. The fan section includes a fan driven by a shaft and the rotor is downstream from the fan. The rotor includes a rotor blade having an airfoil extending from a root to a tip and having a leading edge and a trailing edge. The airfoil has a plurality of chord lines spaced apart in a spanwise direction from 0% span at the root to 100% span at the tip. Each chord line of the plurality of chords lines is defined between the leading edge and the trailing edge and has a normalized chord value. From the hub, the normalized chord value decreases to a minimum value between about 20% to about 90% span and increases from the minimum value to the tip. The rotor includes a rotor disk coupled to the rotor blade configured to be coupled to the shaft or the fan to rotate with the shaft or the fan, respectively, at the same speed as the shaft and fan and to receive a portion of a fluid flow from the fan.

The normalized chord value has an absolute maximum value at the root. Between the minimum value and the tip, the normalized chord value has a second maximum value at the tip that is less than the absolute maximum value. The normalized chord value decreases monotonically to the minimum value from the hub. The minimum value is defined between 50% to 90% span. The minimum value is defined between 60% to 80% span. The minimum value is defined between 20% to 50% span. The normalized chord value has an absolute maximum value at the tip. The rotor disk is coupled to the fan to rotate with the fan, and the rotor disk is downstream from a fan core stator to receive the portion of the fluid flow from the fan. The rotor blade has an inlet hub-to-tip radius ratio that is greater than 0.7 at the leading edge.

Further provided is a rotor for a turbofan booster section associated with a fan section of a gas turbine engine. The fan section includes a fan driven by a shaft and the rotor is downstream from the fan. The rotor includes a rotor blade having an airfoil extending from a root to a tip and having a leading edge and a trailing edge. The airfoil has a plurality of chord lines spaced apart in a spanwise direction from 0% span at the root to 100% span at the tip. Each chord line of the plurality of chords lines is defined between the leading edge and the trailing edge, and has a normalized chord value. From the hub, the normalized chord value decreases to a minimum value between about 20% to about 90% span and increases from the minimum value to a second maximum value at the tip, and the normalized chord value has an absolute maximum value at the root that is greater than the second maximum value. The rotor includes a rotor disk coupled to the rotor blade configured to be coupled to the shaft or the fan to rotate with the shaft or the fan, respectively, at the same speed as the shaft and fan and to receive a portion of a fluid flow from the fan.

The normalized chord value decreases monotonically to the minimum value from the hub. The minimum value is defined between 50% to 90% span. The minimum value is defined between 60% to 80% span. The minimum value is defined between 20% to 50% span. The rotor blade has an inlet hub-to-tip radius ratio that is greater than 0.7 at the leading edge.

Also provided is a rotor for a turbofan booster section associated with a fan section of a gas turbine engine. The fan section includes a fan driven by a shaft and the rotor is downstream from the fan. The rotor includes a rotor blade having an airfoil extending from a root to a tip and having a leading edge and a trailing edge. The airfoil has a plurality of chord lines spaced apart in a spanwise direction from 0% span at the root to 100% span at the tip. Each chord line of the plurality of chord lines defined between the leading edge and the trailing edge and has a normalized chord value. From the hub, the normalized chord value decreases monotonically to a minimum value between about 20% to about 90% span and increases from the minimum value to a second maximum value at the tip, and the normalized chord value has an absolute maximum value at the root that is greater than the second maximum value. The rotor includes a rotor disk coupled to the rotor blade configured to be coupled to the fan to rotate with the fan at the same speed as the fan and to receive a portion of a fluid flow from the fan.

The minimum value is defined between 50% to 90% span. The minimum value is defined between 60% to 80% span. The rotor blade has an inlet hub-to-tip radius ratio that is greater than 0.7 at the leading edge.

Further provided according to various embodiments is a rotor for a turbofan booster section associated with a fan section of a gas turbine engine. The fan section includes a fan driven by a shaft, and the rotor is downstream from the fan. The rotor includes a rotor blade having an airfoil extending in a spanwise direction from 0% span at a root to 100% span at a tip and having a leading edge, a trailing edge and a mean camber line. The airfoil has a delta inlet blade angle defined as a difference between a local inlet blade angle defined by a reference line tangent to the mean camber line at the leading edge at a spanwise location and a second reference line parallel to a center line of the gas turbine engine at the spanwise location, and a root inlet blade angle defined by the reference line tangent to the mean camber line at the leading edge at the root and the second reference line parallel to the center line of the gas turbine engine at the root. The delta inlet blade angle decreases in the spanwise direction from the root to a minimum value at greater than 10% span and from the minimum value, the delta inlet blade angle increases to the tip. The rotor includes a rotor disk coupled to the rotor blade configured to be coupled to the shaft or the fan to rotate with the shaft or the fan, respectively, at the same speed as the shaft and the fan and to receive a portion of a fluid flow from the fan.

The minimum value of the delta inlet blade angle is positioned at greater than 10% span and less than 20% span. The value of the delta inlet blade angle at the tip is greater than the value of the delta inlet blade angle at the root. The value of the delta inlet blade angle increases monotonically between 20% span and 75% span. The airfoil further comprises a plurality of chord lines that extend between the leading edge and the trailing edge, and each chord line of the plurality of chord lines is spaced apart in the spanwise direction. A delta stagger angle is defined as a difference a local stagger angle defined between a chord line of the plurality of chord lines at a spanwise location and a third reference line tangent to the chord line of the plurality of chord lines at the spanwise location, and a root stagger angle defined between the chord line of the plurality of chord lines at the root and the third reference line tangent to the chord line of the plurality of chord lines at the root. A rate of change of the delta stagger angle varies in the spanwise direction. The rate of change of the delta stagger angle has a first rate of change proximate the root, which is a minimum rate of change of the delta stagger angle. The rate of change of the delta stagger angle has a second rate of change between 15% span and 75% span that is different and less than a third rate of change of the delta stagger angle between 75% span and 90% span. The rate of change of the delta stagger angle has a fourth rate of change proximate the tip that is greater than the second rate of change of the delta stagger angle. The rate of change of the delta stagger angle has a fourth rate of change proximate the tip that is a maximum rate of change of the delta stagger angle. The rotor disk is coupled to the fan to rotate with the fan, and the rotor disk is downstream from a fan core stator to receive the portion of the fluid flow from the fan.

Also provided is a rotor for a turbofan booster section associated with a fan section of a gas turbine engine. The fan section includes a fan driven by a shaft and the rotor is downstream from the fan. The rotor includes a rotor blade having an airfoil extending in a spanwise direction from 0% span at a root to 100% span at a tip and having a leading edge, a trailing edge and a mean camber line. The airfoil has a delta inlet blade angle defined as a difference between a local inlet blade angle defined by a reference line tangent to the mean camber line at the leading edge at a spanwise location and a second reference line parallel to a center line of the gas turbine engine at the spanwise location and a root inlet blade angle defined by the reference line tangent to the mean camber line at the leading edge at the root and the second reference line parallel to the center line of the gas turbine engine at the root. The delta inlet blade angle decreases in the spanwise direction from the root to a minimum value between 10% span and 20% span, and from the minimum value, the delta inlet blade angle increases to the tip. The value of the delta inlet blade angle at the tip is greater than the value of the delta inlet blade angle at the root. The rotor includes a rotor disk coupled to the rotor blade configured to be coupled to the shaft or the fan to rotate with the shaft or the fan, respectively, at the same speed as the shaft and the fan and to receive a portion of a fluid flow from the fan.

The value of the delta inlet blade angle increases monotonically between 20% span and 75% span. The airfoil further comprises a plurality of chord lines that extend between the leading edge and the trailing edge. Each chord line of the plurality of chord lines is spaced apart in the spanwise direction. A delta stagger angle is defined as a difference a local stagger angle defined between a chord line of the plurality of chord lines at a spanwise location and a third reference line tangent to the chord line of the plurality of chord lines at the spanwise location and a root stagger angle defined between the chord line of the plurality of chord lines at the root and the third reference line tangent to the chord line of the plurality of chord lines at the root. A rate of change of the delta stagger angle varies in the spanwise direction. The rate of change of the delta stagger angle has a first rate of change proximate the root, which is a minimum rate of change of the delta stagger angle. The rate of change of the delta stagger angle has a second rate of change between 15% span and 75% span that is different and less than a third rate of change of the delta stagger angle between 75% span and 90% span. The rate of change of the delta stagger angle has a fourth rate of change proximate the tip that is greater than the second rate of change of the delta stagger angle. The rate of change of the delta stagger angle has a fourth rate of change proximate the tip that is a maximum rate of change of the delta stagger angle.

Further provided is a rotor for a turbofan booster section associated with a fan section of a gas turbine engine. The fan section includes a fan driven by a shaft. The rotor is downstream from the fan. The rotor includes a rotor blade having an airfoil extending in a spanwise direction from 0% span at a root to 100% span at a tip and having a leading edge, a trailing edge and a mean camber line. The airfoil has a delta inlet blade angle defined as a difference between a local inlet blade angle defined by a reference line tangent to the mean camber line at the leading edge at a spanwise location and a second reference line parallel to a center line of the gas turbine engine at the spanwise location and a root inlet blade angle defined by the reference line tangent to the mean camber line at the leading edge at the root and the second reference line parallel to the center line of the gas turbine engine at the root. The delta inlet blade angle decreases in the spanwise direction from the root to a minimum value at greater than 10% span and from the minimum value, the delta inlet blade angle increases to the tip. The airfoil includes a plurality of chord lines that extend between the leading edge and the trailing edge, and each chord line of the plurality of chord lines spaced apart in the spanwise direction. A delta stagger angle is defined as a difference a local stagger angle defined between a chord line of the plurality of chord lines at a spanwise location and a third reference line tangent to the chord line of the plurality of chord lines at the spanwise location and a root stagger angle defined between the chord line of the plurality of chord lines at the root and the third reference line tangent to the chord line of the plurality of chord lines at the root. A rate of change of the delta stagger angle varies in the spanwise direction. The rotor includes a rotor disk coupled to the rotor blade configured to be coupled to the shaft or the fan to rotate with the shaft or the fan, respectively, at the same speed as the shaft and the fan and to receive a portion of a fluid flow from the fan.

The minimum value of the delta inlet blade angle is positioned at greater than 10% span and less than 20% span. The rate of change of the delta stagger angle is a minimum proximate the root and a maximum proximate the tip.

Further provided according to various embodiments is a rotor for a turbofan booster section associated with a fan section of a gas turbine engine. The fan section includes a fan driven by a shaft, and the rotor is downstream from the fan. The rotor includes a rotor blade having an airfoil extending in a spanwise direction from 0% span at a root to 100% span at a tip and having a leading edge and a trailing edge. The airfoil has a plurality of spanwise locations between the root and the tip each having a normalized local maximum thickness. A value of the normalized local maximum thickness decreases from the root to a minimum value and increases from the minimum value to the tip, and the minimum value is within 60% span to 90% span. The rotor includes a rotor disk coupled to the rotor blade configured to be coupled to the shaft or the fan to rotate with the shaft or the fan, respectively, at the same speed as the shaft and the fan and to receive a portion of a fluid flow from the fan.

The airfoil has a mean camber line that extends from the leading edge to the trailing edge, and each of the plurality of spanwise locations has a location of a local maximum thickness defined as a ratio of a first arc distance along the mean camber line between the leading edge and a position of the local maximum thickness to a total arc distance along the mean camber line from the leading edge to the trailing edge. The ratio is less than or equal to 0.45 along the airfoil from the root to the tip. The minimum value is an absolute minimum value for the normalized local maximum thickness over the span of the airfoil. The value of the normalized local maximum thickness at the root is different than the value of the normalized local maximum thickness at the tip. The value of the normalized local maximum thickness at the tip is less than the value of the normalized local maximum thickness at the root. The minimum value of the normalized local maximum thickness is defined between 70% and 80% span. The value of the normalized local maximum thickness decreases monotonically from the root to the minimum value. The normalized local maximum thickness is a ratio of a local maximum thickness at a spanwise location and the local maximum thickness at the root. The rotor disk is coupled to the fan to rotate with the fan, and the rotor disk is downstream from a fan core stator to receive the portion of the fluid flow from the fan.

Also provided is a rotor for a turbofan booster section associated with a fan section of a gas turbine engine. The fan section includes a fan driven by a shaft, and the rotor is downstream from the fan. The rotor includes a rotor blade having an airfoil extending in a spanwise direction from 0% span at a root to 100% span at a tip and having a leading edge and a trailing edge. The airfoil has a plurality of spanwise locations between the root and the tip each having a normalized local maximum thickness. A value of the normalized local maximum thickness decreases from the root to a minimum value and increases from the minimum value to the tip, and the value of the normalized local maximum thickness at the root is different than the value of the normalized local maximum thickness at the tip. The minimum value is within 60% span to 90% span. The rotor includes a rotor disk coupled to the rotor blade configured to be coupled to the shaft or the fan to rotate with the shaft or the fan, respectively, at the same speed as the shaft and the fan and to receive a portion of a fluid flow from the fan.

The airfoil has a mean camber line that extends from the leading edge to the trailing edge, and each of the plurality of spanwise locations has a location of a local maximum thickness defined as a ratio of a first arc distance along the mean camber line between the leading edge and a position of the local maximum thickness to a total arc distance along the mean camber line from the leading edge to the trailing edge. The ratio is less than or equal to 0.45 along the airfoil from the root to the tip. The minimum value is an absolute minimum value for the normalized local maximum thickness over the span of the airfoil. The value of the normalized local maximum thickness at the tip is less than the value of the normalized local maximum thickness at the root. The minimum value of the normalized local maximum thickness is defined between 70% and 80% span. The value of the normalized local maximum thickness decreases monotonically from the root to the minimum value. The normalized local maximum thickness is a ratio of a local maximum thickness at a spanwise location and the local maximum thickness at the root.

Further provided is a rotor for a turbofan booster section associated with a fan section of a gas turbine engine. The fan section includes a fan driven by a shaft, and the rotor is downstream from the fan. The rotor includes a rotor blade having an airfoil extending in a spanwise direction from 0% span at a root to 100% span at a tip and having a leading edge and a trailing edge. The airfoil has a plurality of spanwise locations between the root and the tip each having a normalized local maximum thickness. A value of the normalized local maximum thickness decreases from the root to a minimum value and increases from the minimum value to the tip over the span of the airfoil, and the minimum value is within 60% span to 90% span. The airfoil includes a mean camber line that extends from the leading edge to the trailing edge, and each of the plurality of spanwise locations has a location of a local maximum thickness defined as a ratio of a first arc distance along the mean camber line between the leading edge and a position of the local maximum thickness to a total arc distance along the mean camber line from the leading edge to the trailing edge. The ratio is less than or equal to 0.45 along the airfoil from the root to the tip. The rotor includes a rotor disk coupled to the rotor blade configured to be coupled to the shaft or the fan to rotate with the shaft or the fan, respectively, at the same speed as the shaft and the fan and to receive a portion of a fluid flow from the fan.

The value of the normalized local maximum thickness at the tip is less than the value of the normalized local maximum thickness at the root. The minimum value of the normalized local maximum thickness is defined between 70% and 80% span. The value of the normalized local maximum thickness decreases monotonically from the root to the minimum value.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
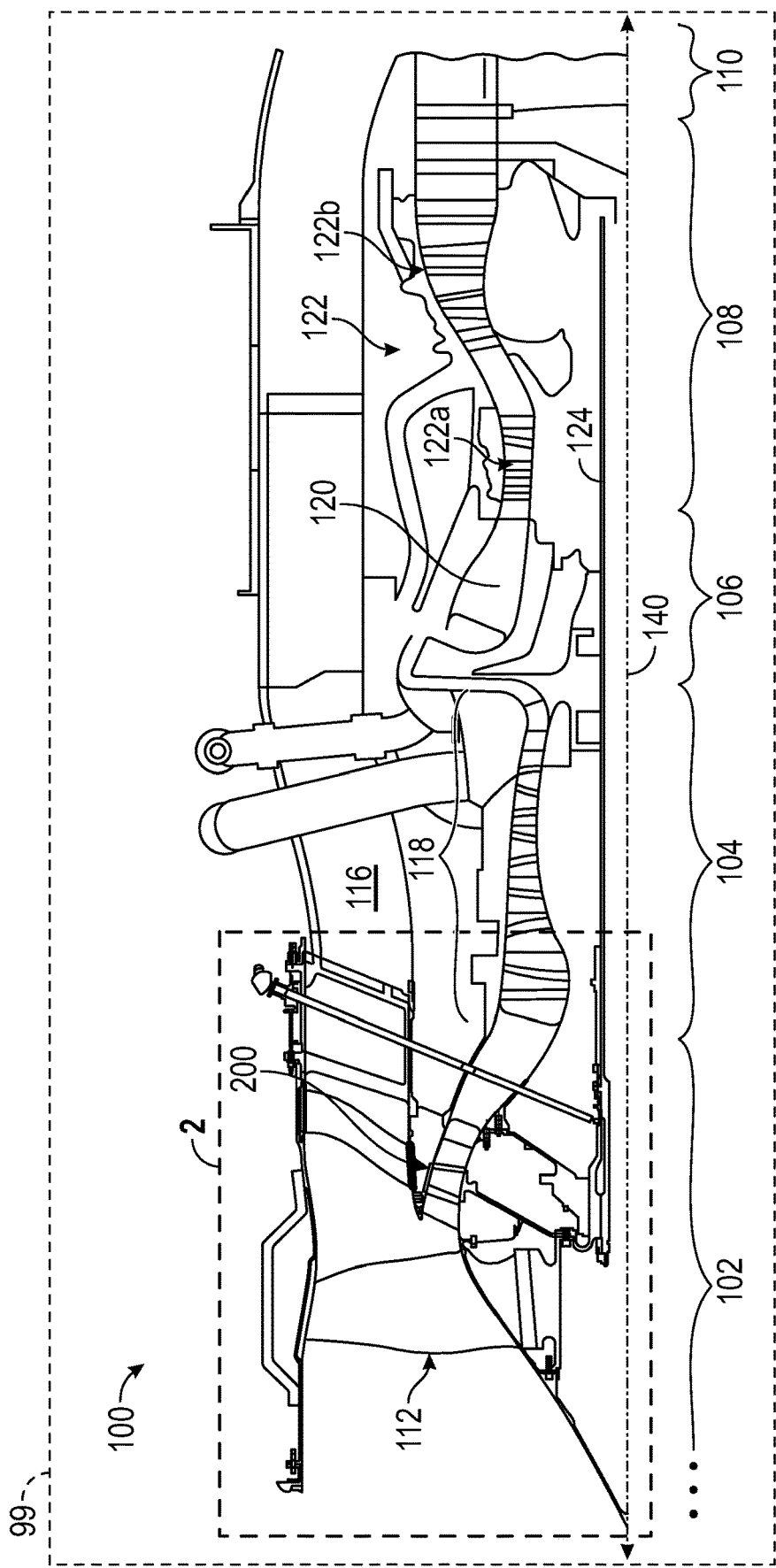
FIG. 1 is a schematic cross-sectional illustration of a gas turbine engine, which includes an exemplary booster rotor and rotor blade in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of booster rotor that would benefit from an increased efficiency and stability in view of endwall velocity deficits, and the booster rotor of a fan section described herein is merely one exemplary embodiment according to the present disclosure. In addition, while the booster rotor is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel. As used herein, an "absolute" value is a value that is the largest (maximum) or smallest (minimum) value over an entirety of a span (from 0% span to 100% span) of an airfoil.

With reference to FIG. 1, a partial, cross-sectional view of an exemplary gas turbine engine 100 is shown with the remaining portion of the gas turbine engine 100 being generally axisymmetric about a longitudinal axis 140, which also comprises an axis of rotation or centerline for the rotating components in the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIG. 2, the gas turbine engine 100 includes a booster rotor 200 including a plurality of rotor blades 202. In one example, the plurality of rotor blades have a characteristic distribution, such as a normalized chord distribution. By providing the normalized chord distribution of the present disclosure, the booster rotor 200 has increased efficiency and stability in view of the endwall meridional velocity deficits encountered during operation. In one alternative embodiment, the booster rotor 200 includes a plurality of rotor blades 302 that have a characteristic distribution, such as a delta inlet blade angle distribution and a delta stagger angle distribution. By providing the delta inlet blade angle distribution and the delta stagger angle distribution of the present disclosure, the booster rotor 200 more effectively manages endwall aerodynamic loading, which also results in increased efficiency and stability in view of the endwall meridional velocity deficits encountered during operation. In one alternative embodiment, the booster rotor 200 includes a plurality of rotor blades 402 that have a characteristic distribution, such as a normalized local maximum thickness distribution. By providing the normalized local maximum thickness distribution of the present disclosure, the rotor blade 402 is robust without increasing a weight of the booster rotor 200 or negatively impacting efficiency as the locations of the rotor blade 402 more prone to potential foreign object encounters have a greater normalized local maximum thickness than a remainder of the rotor blade 402. It should be noted that while the booster rotor 200 is described herein as including a respective one of the rotor blades 202, 302, 402, a booster rotor for use with the gas turbine engine 100 may include a rotor blade having a characteristic distribution including the normalized chord distribution, the delta inlet blade angle distribution, the delta stagger angle distribution, the normalized local maximum thickness distribution and combinations thereof. In one example, the efficiency of the booster rotor 200 employing the characteristic distribution including the normalized chord distribution, the delta inlet blade angle distribution, the delta stagger angle distribution, the normalized local maximum thickness distribution and combinations thereof is increased by up to 1% or more.

In this example, with reference back to FIG. 1, the gas turbine engine 100 includes fan and booster section 102, a compressor section 104, a combustor section 106, a turbine section 108, and an exhaust section 110. In one example, the fan and booster section 102 includes a fan rotor 112, which draws air into the gas turbine engine 100 and accelerates it. A portion of the accelerated air exhausted from the fan rotor 112 is directed through an outer (or first) bypass duct 116 and the remaining portion of air exhausted from the fan rotor 112 is directed toward the booster rotor 200 and subsequently into the compressor section 104. In this example, the fan and booster section 102 also includes the booster rotor 200 downstream of the fan rotor 112, as will be discussed further herein. The compressor section 104 includes one or more compressors 118. The number of compressors 118 in the compressor section 104 and the configuration thereof may vary. The one or more compressors 118 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 120, the high pressure air is mixed with fuel, which is combusted. The high-temperature combustion air is directed into the turbine section 108. In this example, the turbine section 108 includes one or more turbines 122 disposed in axial flow series. In one example, the one or more turbines 122 may include one or more high pressure turbines 122a and one or more low pressure turbines 122b. It will be appreciated that the number of turbines, and/or the configurations thereof, may vary. The combustive gas expands through and rotates the turbines 122. The combustive gas flow then exits turbine section 108 for mixture with the cooler bypass airflow from the outer bypass duct 116 and is ultimately discharged from gas turbine engine 100 through exhaust section 110. As the turbines 122 rotate, each drives equipment in the gas turbine engine 100 via concentrically disposed shafts or spools. In one example, with additional reference to FIG. 2, the fan rotor 112 is connected directly to a low pressure turbine shaft 124. In another example, the fan rotor 112 is coupled to shaft 124 through a fan stub-shaft 125. In either case, the fan rotor 112 and the booster rotor 200 rotate at the same speed as each other and at the same speed as the low pressure turbines 122b of the turbines 122 in a "direct drive" configuration. Still in other cases, the fan stub-shaft 125 is coupled to the shaft 124 indirectly through a speed reduction gearbox (not shown), such that the rotational speed of the fan rotor 112, the booster rotor 200 and the fan stub-shaft 125 are each lower than the rotational speed of the shaft 124 in a "geared" configuration. Regardless of the configuration, the fan rotor 112 and the booster rotor 200 rotate at the same speed and are not limited to direct drive or geared configurations.

Figure 2:
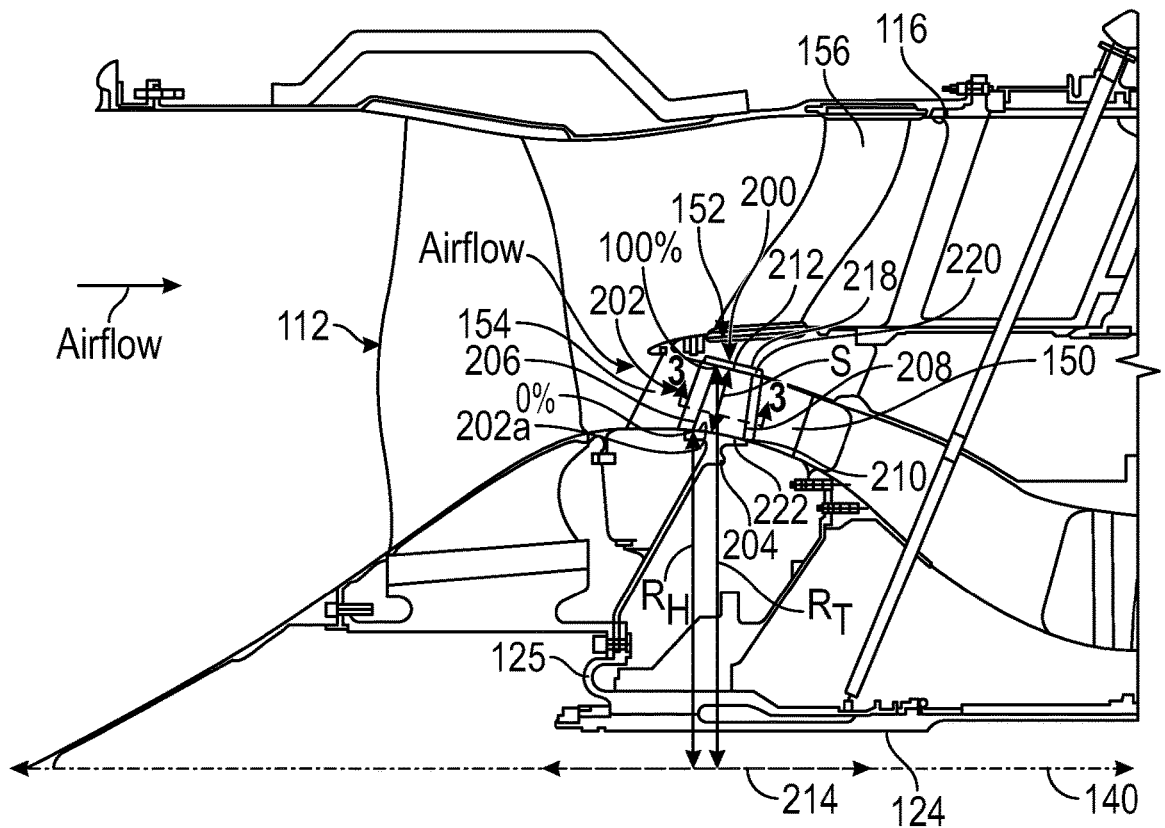
FIG. 2 is a detail cross-sectional view of the booster rotor and rotor blade of FIG. 1, taken at 2 of FIG. 1, in which the rotor blade has a normalized chord distribution in accordance with the various embodiments of the present disclosure.
Figure 2:
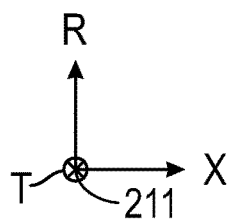

With reference to FIG. 2, the booster rotor 200 is shown in greater detail. In the example of FIG. 2, the booster rotor 200 is a booster axial rotor, which functions with a booster stator 150 to form a booster stage 152. The booster stage 152 is part of a turbofan booster section of the fan and booster section 102. The booster stage 152 is downstream from a fan core stator 154, which is downstream from the fan rotor 112. The fan core stator 154 receives the portion of the fluid flow or core flow from the fan rotor 112 to direct the portion of the fluid flow into the compressor section 104. A fan bypass stator 156 is also downstream of the fan rotor 112, and receives the portion of the fluid flow or bypass flow from the fan rotor 112 into the outer bypass duct 116. In this example, the gas turbine engine 100 is shown with a single booster stage 152, however, it will be understood that the gas turbine engine 100 may include additional booster stages 152. The booster rotor 200 is downstream from the fan rotor 112, and receives a portion of the fluid flow from the fan rotor 112, which is directed from the fan rotor 112 through the fan core stator 154 to the booster stage 152. In this example, by positioning the booster rotor 200 directly downstream from the fan core stator 154, the booster rotor 200 operates with endwall velocity deficits. Generally, due to boundary layer buildup forward of the booster rotor 200 along an outer and inner flow path (which is primarily from meridional flow on shroud and hub walls in a diffusing flow field, but may also be affected due to incidence swings on the fan core stator 154 as bypass ratio changes), the booster rotor 200 may experience axial inlet velocity deficits at both endwalls or at both the root 210 and the tip 212 of the airfoil 202, which lowers both the stability and the efficiency of the booster rotor 200. The axial velocity deficit at the inner endwall or root 210 may also propagate downstream and increase risk of boundary layer separation. The characteristic distribution of the airfoils 202, 302 of the booster rotor 200 discussed herein, such as the normalized chord distribution, the delta inlet blade angle distribution and the delta stagger angle distribution, each reduce the impact of the axial inlet velocity deficits, and thereby increases both stability and efficiency of the booster rotor 200. In addition, the characteristic distribution of the airfoils 402 of the booster rotor 200, such as the normalized local maximum thickness distribution discussed herein, provides robustness against foreign object encounters without increasing a weight of the booster rotor 200 or negatively impacting efficiency.

Normalized Chord Distribution

The booster rotor 200 includes a rotor disk 204 and in this example, a plurality of rotor blades 202 that are spaced apart about a perimeter or circumference of the rotor disk 204. For ease of illustration, one of the plurality of rotor blades 202 for use with the booster rotor 200 of the gas turbine engine 100 is shown. Each of the rotor blades 202 may be referred to as an "airfoil 202." Each airfoil 202 extends in a radial direction (relative to the longitudinal axis 140 of the gas turbine engine 100) about the periphery of the rotor disk 204. The airfoils 202 each include a leading edge 206, an axially-opposed trailing edge 208, a base or root 210, and a radially-opposed tip 212. The tip 212 is spaced from the root 210 in a blade height, span or spanwise direction, which generally corresponds to the radial direction or R-axis of a coordinate legend 211 in the view of FIG. 2. In this regard, the radial direction or R-axis is radially outward and orthogonal to the axial direction or X-axis, and the axial direction or X-axis is parallel to the longitudinal axis 140 or axis of rotation of the gas turbine engine 100. A tangential direction or T-axis is mutually orthogonal to the R-axis and the X-axis. The booster rotor 200 includes multiple airfoils 202 which are spaced about a rotor rotational axis 214. The rotor rotational axis 214 is substantially parallel to and collinear with the longitudinal axis 140 of the gas turbine engine 100.

The span S of each of the airfoils 202 is 0% at the root 210 (where the airfoil 202 is coupled to a rotor hub 222) and is 100% at the tip 212. In this example, the airfoils 202 are arranged in a ring or annular array surrounded by an annular housing piece 218, which defines a pocket 220 for an abradable coating. The airfoils 202 and the rotor disk 204 are generally composed of a metal, metal alloy or a polymer-based material, such as a polymer-based composite material. In one example, the airfoils 202 are integrally formed with the rotor disk 204 as a monolithic or single piece structure commonly referred to as a bladed disk or "blisk." In other examples, the airfoils 202 may be insert-type blades, which are received in mating slots provided around the outer periphery of rotor disk 204. In still further examples, the booster rotor 200 may have a different construction. Generally, then, it should be understood that the booster rotor 200 is provided by way of non-limiting example and that the booster rotor 200 (and the airfoils 202 described herein) may be fabricated utilizing various different manufacturing approaches. Such approaches may include, but are not limited to, casting and machining, three dimensional metal printing processes, direct metal laser sintering, Computer Numerical Control (CNC) milling of a preform or blank, investment casting, electron beam melting, binder jet printing, powder metallurgy and ply lay-up, to list but a few examples. Regardless of its construction, the booster rotor 200 includes the rotor hub 222 defining a booster hub flow path. The booster hub flow path is the outer surface of the rotor disk 204 and extends between the airfoils 202 to guide airflow along from the inlet end (leading edge) to the outlet end (trailing edge) of the booster rotor 200.

As shown in FIG. 2, each of the plurality of airfoils 202 is coupled to the rotor hub 222 at the root 210 (0% span). It should be noted that while each of the plurality of airfoils 202 are illustrated herein as being coupled to the rotor hub 222 with a fillet 202a that defines a curvature relative to the axial direction (X-axis), one or more of the plurality of airfoils 202 may be coupled to the rotor hub 222 with a fillet 202a along a straight line. Further, it should be noted that one or more of the plurality of airfoils 202 may be coupled to the rotor hub 222 along a complex curved surface. It should be noted that in the instances where the plurality of airfoils 202 are coupled to the rotor hub 222 at an angle with the fillet 202a, the span remains at 0% at the root 210. In other words, the span of each of the plurality of airfoils 202 remains at 0% at the root 210 regardless of the shape of the fillet 202a.

Figure 3:
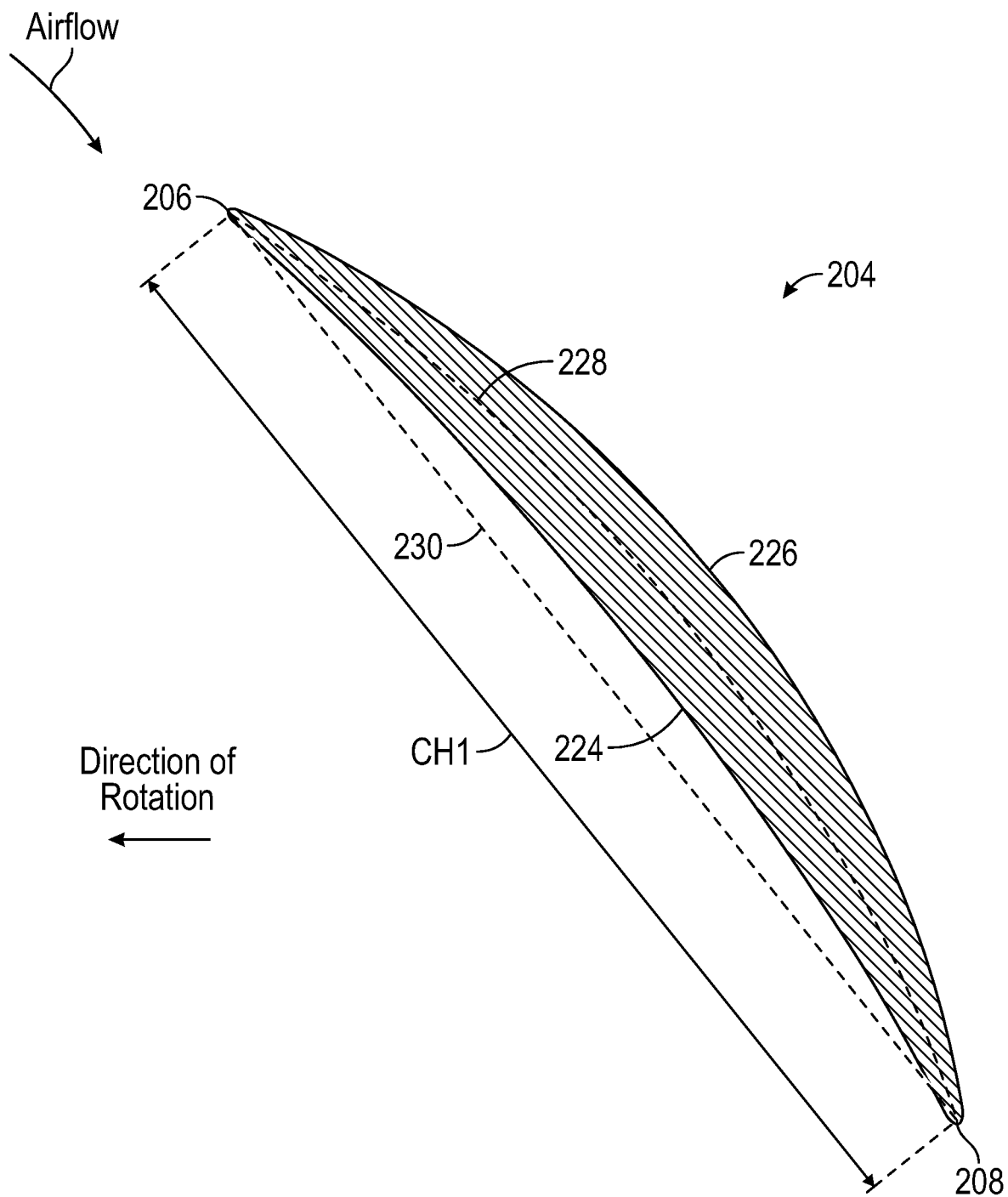
FIG. 3 is a cross-sectional view of the rotor blade of FIG. 2, taken along line 3-3 of FIG. 2.

With reference to FIG. 3, each of the airfoils 202 further includes a first principal face or a "pressure side" 224 and a second, opposing face or a "suction side" 226. The pressure side 224 and the suction side 226 extend in a chordwise direction along a chord line 230 and are opposed in a thickness direction normal to a mean camber line 228, which is illustrated as a dashed line in FIG. 3 that extends from the leading edge 206 to the trailing edge 208. The chord line 230 has a chord length CH1, which is a numerical value for a distance along a straight line that connects the leading edge 206 to the trailing edge 208 at the particular spanwise location of the airfoil 202. Based on the predetermined shape of the airfoil 202, the value of the chord length CH1 may vary in a spanwise direction (from 0% span to 100% span) over the airfoil 202, as will be discussed. The pressure side 224 and the suction side 226 extend from the leading edge 206 to the trailing edge 208. In one example, each of the airfoils 202 is somewhat asymmetrical and cambered along the mean camber line 228. The pressure side 224 has a contoured, generally concave surface geometry, which gently bends or curves in three dimensions. The suction side 226 has a contoured, generally convex surface geometry, which likewise bends or curves in three dimensions. In other embodiments, the airfoils 202 may not be cambered and may be either symmetrical or asymmetrical.

In this example, each one of the airfoils 202 has a plurality of chord lines 230, with each of the plurality of chord lines 230 having a respective value or chord length CH1 at a particular spanwise location of the airfoil 202. In this example, the plurality of chord lines 230 are spaced apart from 0% span at the root 210 to 100% span at the tip 212, with the direction from the root 210 (0% span) to the tip 212 (100%) considered the spanwise direction. Thus, the airfoil 202 has the plurality of chord lines 230 spaced apart in the spanwise direction from 0% span at the root to 100% span at the tip. In addition, for a particular span of the airfoil 202, each of the airfoils 202 have a respective normalized chord length or normalized chord value associated with the respective chord line 230, which is defined by the following equation:

$$\text{Normalized Chord Length} = \frac{\text{Local Chord Length}}{\text{Root Chord Length}} \quad (1)$$

Wherein Normalized Chord Length is the normalized chord length or normalized chord value for the particular spanwise location; Local Chord Length is the local chord length or chord value for the chord line 230 at the particular spanwise location; and Root Chord Length is the local chord length or chord value at the hub, root 210 or 0% span of the airfoil 202. In one example, the root chord length is about 1.6 to 2.1 inches. In one example, the normalized chord length for each of the airfoils 202 varies over the span S based on a normalized chord length distribution 232 of the airfoil 202 (FIG. 4).

Figure 4:
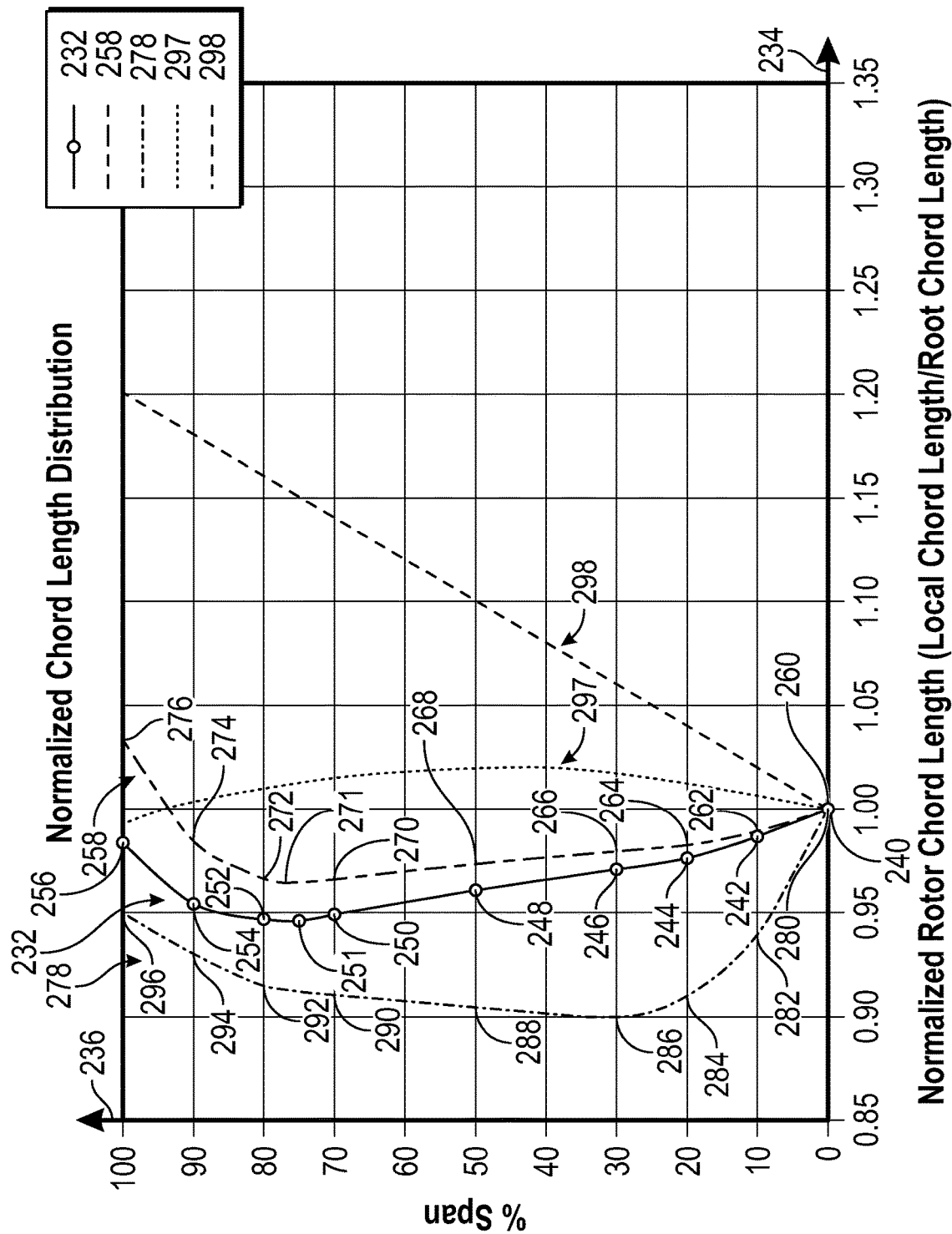
FIG. 4 is a graph of a value of a normalized chord length (normalized chord length; abscissa) of a chord line associated with the rotor blade versus a percent span (ordinate) illustrating a spanwise normalized chord distribution associated with the rotor blade of FIG. 2.

In one example, with reference to FIG. 4, a graph shows the normalized chord length distribution 232 along the span of each of the airfoils 202. In FIG. 4, the abscissa or horizontal axis 234 is the value of the normalized chord length determined using equation (1); and the ordinate or vertical axis 236 is the spanwise location or location along the span of each of the airfoils 202 (span is 0% at the root 210 (FIG. 2) and span is 100% at the tip 212 (FIG. 2)). In one example, the value of the normalized chord length ranges from about 0.95 to 1.0.

As shown in FIG. 4, at 0% span, the chord line 230 that extends from the leading edge 206 to the trailing edge 208 (FIG. 2) has a normalized chord value 240. In this example, the normalized chord value 240 is an absolute maximum value for the normalized chord length over the span of the airfoil 202. At 10% span, the chord line 230 that extends from the leading edge 206 to the trailing edge 208 (FIG. 2) has a normalized chord value 242. In this example, the normalized chord value 242 is different and less than the normalized chord value 240, such that the value of the normalized chord length between 0% span and 10% span decreases from the root 210 to 10% span. At 20% span, the chord line 230 that extends from the leading edge 206 to the trailing edge 208 (FIG. 2) has a normalized chord value 244. In this example, the normalized chord value 244 is less than the normalized chord value 240 and the normalized chord value 242, such that the value of the normalized chord length between 0% span and 20% span decreases from the root 210 to 20% span. In this example, the value of the normalized chord length decreases monotonically between 0% span and 20% span.

At 30% span, the chord line 230 that extends from the leading edge 206 to the trailing edge 208 (FIG. 2) has a normalized chord value 246. In this example, the normalized chord value 246 is different and less than the normalized chord value 240, the normalized chord value 242 and the normalized chord value 244, such that the value of the normalized chord length between 0% span and 30% span decreases from the root 210 to 30% span. In this example, the value of the normalized chord length decreases monotonically between 0% span and 30% span. At 50% span, the chord line 230 that extends from the leading edge 206 to the trailing edge 208 (FIG. 2) has a normalized chord value 248. In this example, the normalized chord value 248 is different and less than the normalized chord value 240, the normalized chord value 242, the normalized chord value 244 and the normalized chord value 246, such that the value of the normalized chord length between 0% span and 50% span decreases from the root 210 to 50% span. In this example, the value of the normalized chord length decreases monotonically between 0% span and 50% span.

At 70% span, the chord line 230 that extends from the leading edge 206 to the trailing edge 208 (FIG. 2) has a normalized chord value 250. In this example, the normalized chord value 250 is different and less than the normalized chord value 240, the normalized chord value 242, the normalized chord value 244, the normalized chord value 246 and the normalized chord value 248, such that the value of the normalized chord length between 0% span and 70% span decreases from the root 210 to 70% span. In this example, the value of the normalized chord length decreases monotonically between 0% span and 70% span. At 75% span, the chord line 230 that extends from the leading edge 206 to the trailing edge 208 (FIG. 2) has a normalized chord value 251. In this example, the normalized chord value 251 is different and less than the normalized chord value 240, the normalized chord value 242, the normalized chord value 244, the normalized chord value 246, the normalized chord value 248, and the normalized chord value 250. In one example, the normalized chord value 251 is an absolute minimum value for the normalized chord length over the span of the airfoil 202, and is defined between 20% and 90% span. Thus, in this example, the value of the normalized chord length between 0% span and 75% span decreases from the root 210 to 75% span, and the normalized chord value 251 is a minimum value for the normalized chord length over the span of the airfoil 202. In one example, the minimum value is about 0.94 to 0.95, while the absolute maximum value (the normalized chord value 240) is 1.0. Thus, in this example, for the normalized chord length distribution 232, the maximum chord length is at the root 210 as the normalized chord value 240 at the root 210 or 0% span is equal to 1.0. However, as will be discussed, if the chord length at the tip 212 is larger than the root 210, then the normalized chord value will exceed 1.0.

At 80% span, the chord line 230 that extends from the leading edge 206 to the trailing edge 208 (FIG. 2) has a normalized chord value 252. In this example, the normalized chord value 252 is different and less than the normalized chord value 240, the normalized chord value 242, the normalized chord value 244, the normalized chord value 246, the normalized chord value 248 and the normalized chord value 250, but is different and greater than the normalized chord value 251. Thus, in this example, the value of the normalized chord length between 0% span and 75% span decreases from the root 210 to 75% span and increases from 75% span to 80% span.

At 90% span, the chord line 230 that extends from the leading edge 206 to the trailing edge 208 (FIG. 2) has a normalized chord value 254. In this example, the normalized chord value 254 is different and less than the normalized chord value 240, the normalized chord value 242, the normalized chord value 244, the normalized chord value 246 and the normalized chord value 248, but is different and greater than the normalized chord value 250 and the normalized chord value 252. Thus, in this example, the value of the normalized chord length increases between 80% span and 90% span. Generally, the value of the normalized chord length decreases from the root 210 (FIG. 2) or 0% span to a minimum value (in this example, normalized chord value 251) between 20% and 90% span. In this example, the value of the normalized chord length decreases from the root 210 at 0% span monotonically to the minimum value. The minimum value (in this example, normalized chord value 251) is not local to an endwall, for example, the root 210 or the tip 212, in contrast to conventional normalized chord length distributions 297 and 298, and rather is formed between the root 210 and the tip 212, which improves performance of the booster rotor 200 in the presence of large incoming endwall velocity deficits. Moreover, by placing the minimum value between the root 210 and the tip 212, such as between 20% and 90% span, a weight and surface area of the airfoil 202 is reduced.

At 100% span, the chord line 230 that extends from the leading edge 206 to the trailing edge 208 (FIG. 2) has a normalized chord value 256. In this example, the normalized chord value 256 is different and greater than the normalized chord value 244, the normalized chord value 246 and the normalized chord value 248, the normalized chord value 250, the normalized chord value 251 and the normalized chord value 252, but is different and less than the normalized chord value 240 and the normalized chord value 242. Thus, in this example, the value of the normalized chord length increases from 80% span to the tip 212 (FIG. 2) at 100% span. In this example, the value of the normalized chord length at the tip 212 (FIG. 2) is less than the value of the normalized chord length (normalized chord value 240) at the root 210 (FIG. 2), and the normalized chord value 256 at the tip 212 or 100% span is a second maximum value for the normalized chord length distribution 232 in the spanwise direction from the minimum value (in this example, normalized chord value 251) to the tip 212 (FIG. 2) at 100% span. Generally, the normalized chord value increases from the minimum value (in this example, normalized chord value 251) to the tip 212 (FIG. 2) at 100% span. A maximum value for the normalized chord value between the minimum value (in this example, normalized chord value 251) and the tip 212 at 100% span is at the tip 212 (FIG. 2). A maximum value for the normalized chord value between the minimum value (in this example, normalized chord value 251) and the root 210 at 0% span is at the root 210 (FIG. 2). The increased normalized chord value near the tip 212 and the root 210 (FIG. 2) provides improved management of the increased aerodynamic loadings for improved efficiency and stability of the booster rotor 200. In one example, the second maximum value at the tip 212 or 100% span is 0.97 to 0.99.

FIG. 4 also shows another exemplary normalized chord length distribution 258 along the span for each of the airfoils 202. As shown in FIG. 4, for the normalized chord length distribution 258, at 0% span, the chord line 230 that extends from the leading edge 206 to the trailing edge 208 (FIG. 2) has a normalized chord value 260. At 10% span, the chord line 230 that extends from the leading edge 206 to the trailing edge 208 (FIG. 2) has a normalized chord value 262. In this example, the normalized chord value 262 is different and less than the normalized chord value 260, such that the value of the normalized chord length between 0% span and 10% span decreases from the root 210 to 10% span. At 20% span, the chord line 230 that extends from the leading edge 206 to the trailing edge 208 (FIG. 2) has a normalized chord value 264. In this example, the normalized chord value 264 is less than the normalized chord value 260 and the normalized chord value 262, such that the value of the normalized chord length between 0% span and 20% span decreases from the root 210 to 20% span.

At 30% span, the chord line 230 that extends from the leading edge 206 to the trailing edge 208 (FIG. 2) has a normalized chord value 266. In this example, the normalized chord value 266 is different and less than the normalized chord value 260, the normalized chord value 262 and the normalized chord value 264, such that the value of the normalized chord length between 0% span and 30% span decreases from the root 210 to 30% span. In this example, the value of the normalized chord length decreases monotonically between 0% span and 30% span. At 50% span, the chord line 230 that extends from the leading edge 206 to the trailing edge 208 (FIG. 2) has a normalized chord value 268. In this example, the normalized chord value 268 is different and less than the normalized chord value 260, the normalized chord value 262, the normalized chord value 264 and the normalized chord value 266, such that the value of the normalized chord length between 0% span and 50% span decreases from the root 210 to 50% span. In this example, the value of the normalized chord length decreases monotonically between 0% span and 50% span.

At 70% span, the chord line 230 that extends from the leading edge 206 to the trailing edge 208 (FIG. 2) has a normalized chord value 270. In this example, the normalized chord value 270 is different and less than the normalized chord value 260, the normalized chord value 262, the normalized chord value 264, the normalized chord value 266 and the normalized chord value 268, such that the value of the normalized chord length between 0% span and 70% span decreases from the root 210 to 70% span. In this example, the value of the normalized chord length decreases monotonically between 0% span and 70% span. At 78% span, the chord line 230 that extends from the leading edge 206 to the trailing edge 208 (FIG. 2) has a normalized chord value 271. In this example, the normalized chord value 271 is different and less than the normalized chord value 260, the normalized chord value 262, the normalized chord value 264, the normalized chord value 266, the normalized chord value 268, and the normalized chord value 270. In one example, the normalized chord value 271 is an absolute minimum value for the normalized chord length over the span of the airfoil 202, and is defined between 20% and 90% span. Thus, in this example, the value of the normalized chord length between 0% span and 78% span decreases from the root 210 to 78% span, and the normalized chord value 271 is a minimum value for the normalized chord length over the span of the airfoil 202. In one example, the minimum value is about 0.96 to 0.97.

At 80% span, the chord line 230 that extends from the leading edge 206 to the trailing edge 208 (FIG. 2) has a normalized chord value 272. In this example, the normalized chord value 272 is different and less than the normalized chord value 260, the normalized chord value 262, the normalized chord value 264, the normalized chord value 266, the normalized chord value 268 and the normalized chord value 270, but is different and greater than the normalized chord value 271. Thus, in this example, the value of the normalized chord length between 0% span and 78% span decreases from the root 210 to 78% span and increases from 78% span to 80% span.

At 90% span, the chord line 230 that extends from the leading edge 206 to the trailing edge 208 (FIG. 2) has a normalized chord value 274. In this example, the normalized chord value 274 is different and less than the normalized chord value 260, but is different and greater than the normalized chord value 264, the normalized chord value 266, the normalized chord value 268, the normalized chord value 270 and the normalized chord value 272. Thus, in this example, the value of the normalized chord length increases between 80% span and 90% span. Generally, the value of the normalized chord length decreases from the root 210 (FIG. 2) or 0% span to a minimum value (in this example, normalized chord value 271) between 20% and 90% span. The minimum value (in this example, normalized chord value 271) is not local to an endwall, for example, the root 210 or the tip 212, in contrast to conventional normalized chord length distributions 297 and 298, and rather is formed between the root 210 and the tip 212, which improves performance of the booster rotor 200 in the presence of large incoming endwall velocity deficits. Moreover, by placing the minimum value between the root 210 and the tip 212, such as between 20% and 90% span, a weight and surface area of the airfoil 202 is reduced.

At 100% span, the chord line 230 that extends from the leading edge 206 to the trailing edge 208 (FIG. 2) has a normalized chord value 276. In this example, the normalized chord value 276 is different and greater than the normalized chord value 262, the normalized chord value 264, the normalized chord value 266 and the normalized chord value 268, the normalized chord value 270, the normalized chord value 271 and the normalized chord value 272, and is also different and greater than the normalized chord value 260. Thus, in this example, the value of the normalized chord length increases from 80% span to the tip 212 (FIG. 2) at 100% span. In this example, the normalized chord value 276 is an absolute maximum value for the normalized chord length over the span of the airfoil 202. In this example, the value of the normalized chord length at the tip 212 (FIG. 2) is greater than the value of the normalized chord length (normalized chord value 260) at the root 210 (FIG. 2), and the normalized chord value 260 at the root 210 or 0% span is a second maximum value for the normalized chord length distribution 258. Generally, the normalized chord value increases from the minimum value (in this example, normalized chord value 271) to the tip 212 (FIG. 2) at 100% span. A maximum value for the normalized chord value between the minimum value (in this example, normalized chord value 271) and the tip 212 at 100% span is at the tip 212 (FIG. 2). A maximum value for the normalized chord value between the minimum value (in this example, normalized chord value 271) and the root 210 at 0% span is at the root 210 (FIG. 2). The increased normalized chord value near the tip 212 and the root 210 (FIG. 2) provides improved management of the increased aerodynamic loadings for improved efficiency and stability of the booster rotor 200. In one example, the second maximum value at the tip 212 or 100% span is 1.02 to 1.04.

FIG. 4 also shows another exemplary normalized chord length distribution 278 along the span for each of the airfoils 202. As shown in FIG. 4, for the normalized chord length distribution 278, at 0% span, the chord line 230 that extends from the leading edge 206 to the trailing edge 208 (FIG. 2) has a normalized chord value 280. In this example, the normalized chord value 280 is an absolute maximum value for the normalized chord length over the span of the airfoil 202. At 10% span, the chord line 230 that extends from the leading edge 206 to the trailing edge 208 (FIG. 2) has a normalized chord value 282. In this example, the normalized chord value 282 is different and less than the normalized chord value 280, such that the value of the normalized chord length between 0% span and 10% span decreases from the root 210 to 10% span. At 20% span, the chord line 230 that extends from the leading edge 206 to the trailing edge 208 (FIG. 2) has a normalized chord value 284. In this example, the normalized chord value 284 is less than the normalized chord value 280 and the normalized chord value 282, such that the value of the normalized chord length between 0% span and 20% span decreases from the root 210 to 20% span. In this example, the value of the normalized chord length decreases monotonically between 0% span and 20% span.

At 30% span, the chord line 230 that extends from the leading edge 206 to the trailing edge 208 (FIG. 2) has a normalized chord value 286. In this example, the normalized chord value 286 is different and less than the normalized chord value 280, the normalized chord value 282 and the normalized chord value 284, such that the value of the normalized chord length between 0% span and 30% span decreases from the root 210 to 30% span. In one example, the normalized chord value 284 is an absolute minimum value for the normalized chord length over the span of the airfoil 202, and is defined between 20% and 90% span. The normalized chord value 286 is a minimum value for the normalized chord length over the span of the airfoil 202. In one example, the minimum value is about 0.89 to 0.90, while the absolute maximum value (the normalized chord value 240) is 1.0. At 50% span, the chord line 230 that extends from the leading edge 206 to the trailing edge 208 (FIG. 2) has a normalized chord value 288. In this example, the normalized chord value 288 is different and less than the normalized chord value 280, the normalized chord value 282 and the normalized chord value 284, but is different and greater than the normalized chord value 286.

At 70% span, the chord line 230 that extends from the leading edge 206 to the trailing edge 208 (FIG. 2) has a normalized chord value 290. In this example, the normalized chord value 290 is different and less than the normalized chord value 280 and the normalized chord value 282, but is different and greater than the normalized chord value 286 and the normalized chord value 288. At 80% span, the chord line 230 that extends from the leading edge 206 to the trailing edge 208 (FIG. 2) has a normalized chord value 292. In this example, the normalized chord value 292 is different and less than the normalized chord value 280 and the normalized chord value 282, but is different and greater than the normalized chord value 284, the normalized chord value 286, the normalized chord value 288 and the normalized chord value 290.

At 90% span, the chord line 230 that extends from the leading edge 206 to the trailing edge 208 (FIG. 2) has a normalized chord value 294. In this example, the normalized chord value 294 is different and less than the normalized chord value 280 and the normalized chord value 282, but is different and greater than the normalized chord value 284, the normalized chord value 286, the normalized chord value 288, the normalized chord value 290 and the normalized chord value 282. Thus, in this example, the value of the normalized chord length increases between 80% span and 90% span. Generally, the value of the normalized chord length decreases from the root 210 (FIG. 2) or 0% span to a minimum value (in this example, normalized chord value 286) between 20% and 90% span. In this example, the value of the normalized chord length decreases from the root 210 at 0% span monotonically to the minimum value. The minimum value (in this example, normalized chord value 286) is not local to an endwall, for example, the root 210 or the tip 212, in contrast to conventional normalized chord length distributions 297 and 298, and rather is formed between the root 210 and the tip 212, which improves performance of the booster rotor 200 in the presence of large incoming endwall velocity deficits. Moreover, by placing the minimum value between the root 210 and the tip 212, such as between 20% and 90% span, a weight and surface area of the airfoil 202 is reduced.

At 100% span, the chord line 230 that extends from the leading edge 206 to the trailing edge 208 (FIG. 2) has a normalized chord value 296. In this example, the normalized chord value 296 is different and greater than the normalized chord value 282, the normalized chord value 284, the normalized chord value 286 and the normalized chord value 288, the normalized chord value 290, the normalized chord value 292 and the normalized chord value 294, but is different and less than the normalized chord value 280. Thus, in this example, the value of the normalized chord length increases from 80% span to the tip 212 (FIG. 2) at 100% span. In this example, the value of the normalized chord length at the tip 212 (FIG. 2) is less than the value of the normalized chord length (normalized chord value 280) at the root 210 (FIG. 2), and the normalized chord value 296 at the tip 212 or 100% span is a second maximum value for the normalized chord length distribution 278 in the spanwise direction from the minimum value (in this example, normalized chord value 286). Generally, the normalized chord value increases from the minimum value (in this example, normalized chord value 286) to the tip 212 (FIG. 2) at 100% span. A maximum value for the normalized chord value between the minimum value (in this example, normalized chord value 286) and the tip 212 at 100% span is at the tip 212 (FIG. 2). A maximum value for the normalized chord value between the minimum value (in this example, normalized chord value 286) and the root 210 at 0% span is at the root 210 (FIG. 2). The increased normalized chord value near the tip 212 and the root 210 (FIG. 2) provides improved management of the increased aerodynamic loadings for improved efficiency and stability of the booster rotor 200. In one example, the second maximum value at the tip 212 or 100% span is 0.94 to 0.95.

In one example, with reference back to FIG. 2, each of the airfoils 202 also includes an inlet hub radius $R_H$ and an inlet tip radius $R_T$. The inlet hub radius $R_H$ is a radius from the gas turbine centerline or longitudinal axis 140 to the hub or root 210 of the airfoil 202 at the leading edge 206. The inlet tip radius $R_T$ is a radius from the gas turbine centerline or longitudinal axis 140 to the tip 212 of the airfoil 202 at the leading edge 206. For each of the airfoils 202, the airfoil 202 has an inlet hub-to-tip radius ratio ($R_H/R_T$) that is greater than 0.7. The relatively large hub-to-tip radius ratio helps differentiate the booster rotor 200 from other axial rotors such as fans and axial compressors.

With the airfoils 202 formed, the airfoils 202 are coupled to the rotor hub 222 to form the booster rotor 200. As discussed, each of the airfoils 202 include one of the normalized chord length distributions 232, 258, 278 as shown in FIG. 4. With reference to FIG. 4, the normalized chord length distribution 232 is at an absolute maximum value over the span of the airfoil 202 at the root 210 or 0% span. From 0% span, the normalized chord length distribution 232 decreases monotonically to a minimum value defined between 20% and 90% span, which in this example is the normalized chord value 251 defined at 75%. From the minimum value, the normalized chord value increases to the tip 212 or 100% span. The normalized chord length distribution 258 is at an absolute maximum value over the span of the airfoil 202 at the tip 212 or 100% span. From 0% span, the normalized chord length distribution 232 decreases monotonically to a minimum value defined between 20% and 90% span, which in this example is the normalized chord value 271 defined at 78%. From the minimum value, the normalized chord value increases to the absolute maximum value at the tip 212 or 100% span. The normalized chord length distribution 278 is at an absolute maximum value over the span of the airfoil 202 at the root 210 or 0% span. From 0% span, the normalized chord length distribution 278 decreases to a minimum value defined between 20% and 90% span, which in this example is the normalized chord value 286 defined at 30%. From the minimum value, the normalized chord value increases to the tip 212 or 100% span.

With the booster rotor 200 formed, the booster rotor 200 is installed in the gas turbine engine 100 (FIG. 1). In general, the booster rotor 200 may be incorporated into the fan section described with regard to FIG. 1 above. For example, and additionally referring to FIGS. 1 and 2, the booster rotor 200 is installed downstream of the fan rotor 112 and fan core stator 154 and is driven by the shaft 124 either directly or indirectly coupled to the fan rotor 112, such that as the fan rotor 112 rotates, the booster rotor 200 rotates at the same speed as the fan rotor 112 to compress the air flowing through the airfoils 202 prior to reaching the compressors 118.

Delta Inlet Blade Angle and Stagger Angle Distribution

It should be noted that the plurality of rotor blades 202 may be configured differently to improve stability and efficiency for the booster rotor 200. For example, with reference to FIG. 5, a rotor blade 302 for use with the booster rotor 200 of the gas turbine engine 100 is shown. As the rotor blade 302 includes the same or similar components as the rotor blade 202 discussed with regard to FIGS. 1-4, the same reference numerals will be used to denote the same or similar components.

Figure 5:
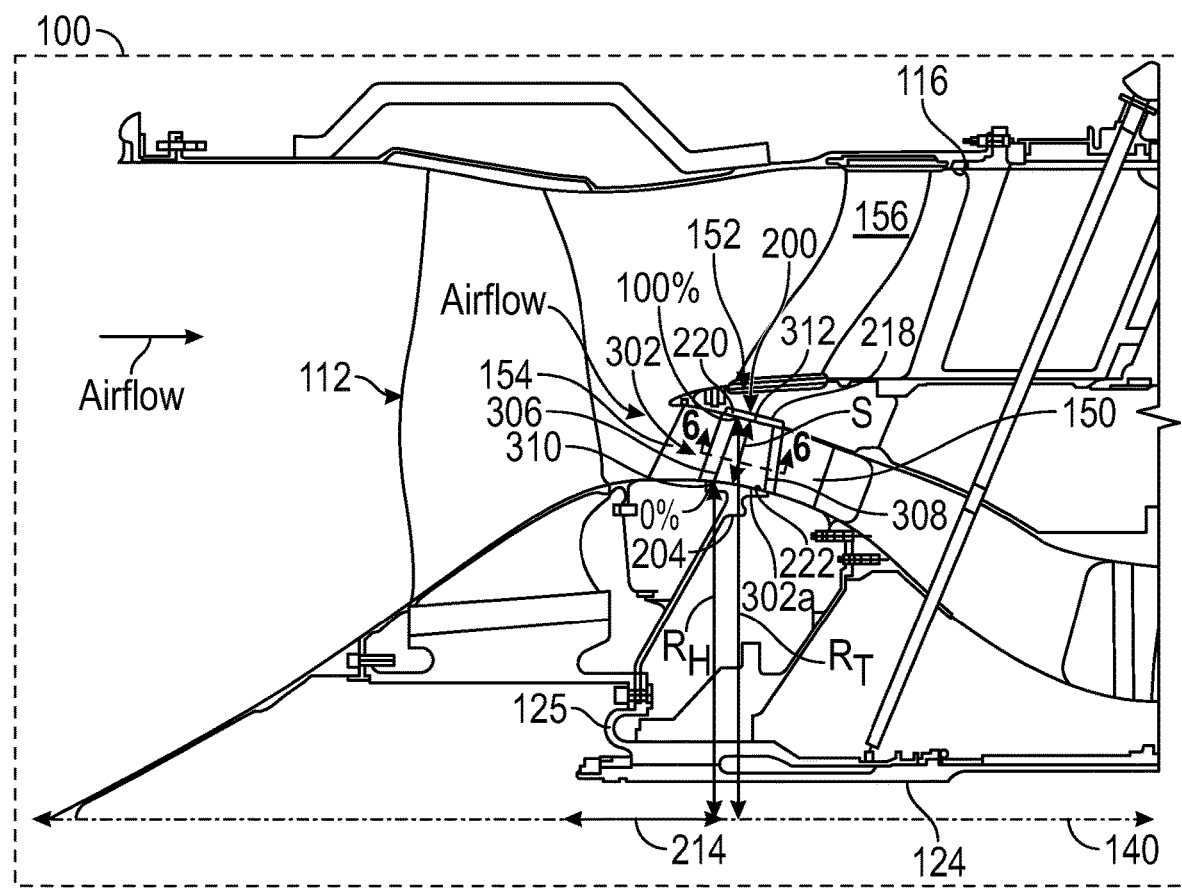
FIG. 5 is a detail cross-sectional view of the booster rotor and rotor blade of FIG. 1, taken at 2 of FIG. 1, in which the rotor blade has a delta inlet blade angle distribution and a delta stagger angle distribution in accordance with the various embodiments of the present disclosure.
Figure 5:
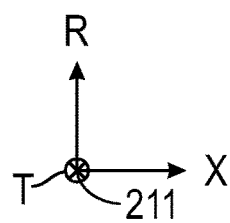

For ease of illustration, one of the plurality of rotor blades 302 for use with the booster rotor 200 of the gas turbine engine 100 is shown in FIG. 5. It should be noted that while a single rotor blade 302 is shown in FIG. 5, the booster rotor 200 includes a plurality of the rotor blades 302, which are spaced apart about a perimeter or circumference of the rotor disk 204. Each of the rotor blades 302 may be referred to as an "airfoil 302." Each airfoil 302 extends in a radial direction (relative to the longitudinal axis 140 of the gas turbine engine 100) about the periphery of the rotor disk 204. The airfoils 302 each include a leading edge 306, an axially-opposed trailing edge 308, a base or root 310, and a radially-opposed tip 312. The tip 312 is spaced from the root 310 in a blade height, span or spanwise direction, which generally corresponds to the radial direction or R-axis of the coordinate legend 211 in the view of FIG. 5. The booster rotor 200 includes multiple airfoils 302 which are spaced about the rotor rotational axis 214.

The span S of each of the airfoils 302 is 0% at the root 310 (where the airfoil 302 is coupled to the rotor hub 222 of the rotor disk 204) and is 100% at the tip 312. In this example, the airfoils 302 are arranged in a ring or annular array surrounded by the annular housing piece 218, which defines the pocket 220. The airfoils 302 and the rotor disk 204 are generally composed of a metal, metal alloy or a polymer-based material, such as a polymer-based composite material. In one example, the airfoils 302 are integrally formed with the rotor disk 204 as a monolithic or single piece structure commonly referred to as a bladed disk or "blisk." In other examples, the airfoils 302 may be insert-type blades, which are received in mating slots provided around the outer periphery of rotor disk 204. In still further examples, the booster rotor 200 may have a different construction. Generally, then, it should be understood that the booster rotor 200 is provided by way of non-limiting example and that the booster rotor 200 (and the airfoils 302 described herein) may be fabricated utilizing various different manufacturing approaches. Such approaches may include, but are not limited to, casting and machining, three dimensional metal printing processes, direct metal laser sintering, Computer Numerical Control (CNC) milling of a preform or blank, investment casting, electron beam melting, binder jet printing, powder metallurgy and ply lay-up, to list but a few examples. The booster hub flow path is the outer surface of the rotor disk 204 and extends between the airfoils 302 to guide airflow along from the inlet end (leading edge) to the outlet end (trailing edge) of the booster rotor 200.

As shown in FIG. 5, each of the plurality of airfoils 302 is coupled to the rotor hub 222 at the root 310 (0% span). It should be noted that while each of the plurality of airfoils 302 are illustrated herein as being coupled to the rotor hub 222 with a fillet 302a that defines a curvature relative to the axial direction (X-axis), one or more of the plurality of airfoils 302 may be coupled to the rotor hub 222 with a fillet 302a along a straight line. Further, it should be noted that one or more of the plurality of airfoils 302 may be coupled to the rotor hub 222 along a complex curved surface. It should be noted that in the instances where the plurality of airfoils 302 are coupled to the rotor hub 222 at an angle with the fillet 302a, the span remains at 0% at the root 310. In other words, the span of each of the plurality of airfoils 302 remains at 0% at the root 310 regardless of the shape of the fillet 302a.

Figure 6:
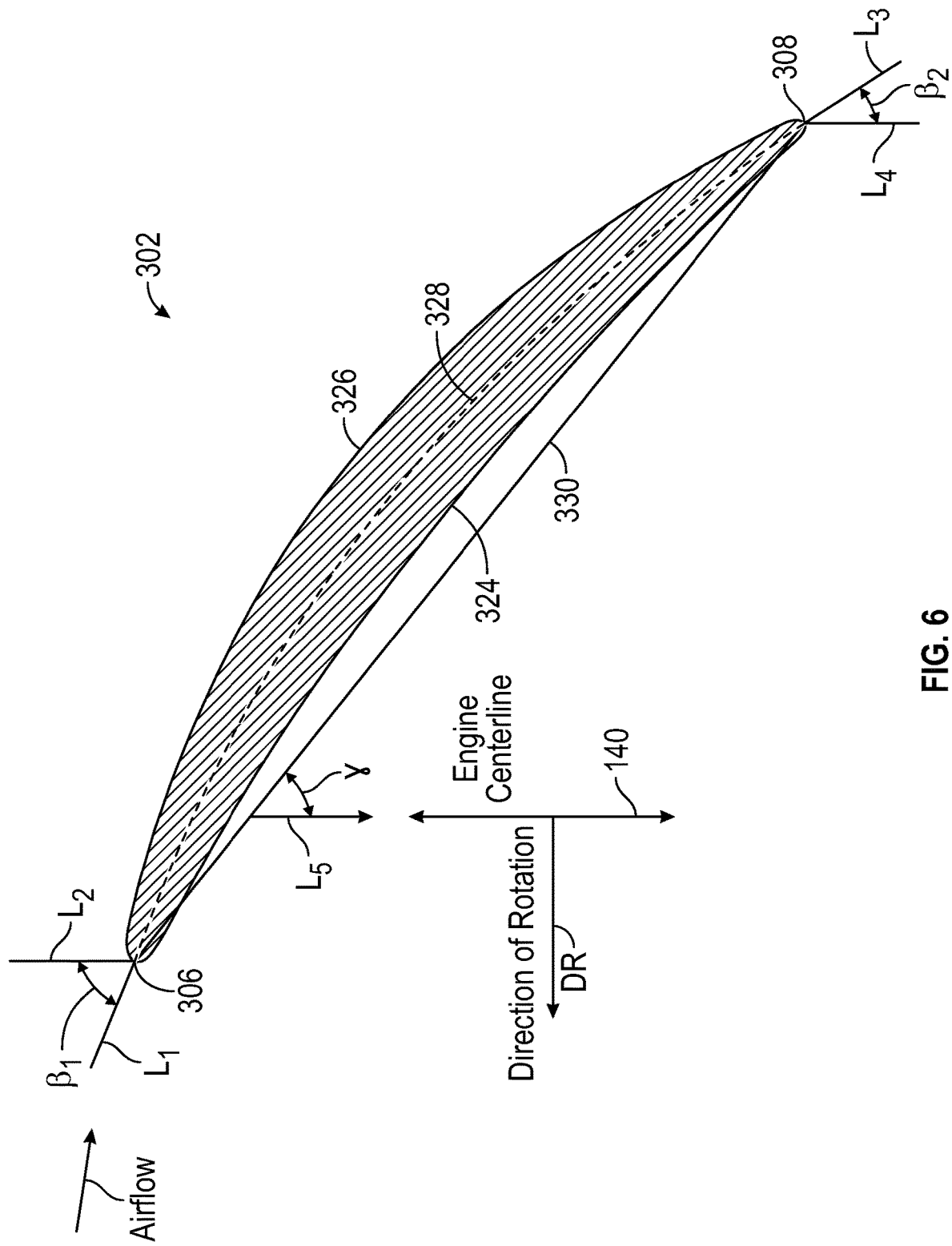
FIG. 6 is a cross-sectional view of the rotor blade of FIG. 5, taken along line 6-6 of FIG. 5.

With reference to FIG. 6, each of the airfoils 302 further includes a first principal face or a "pressure side" 324 and the second, opposing face or a "suction side" 326. The pressure side 324 and the suction side 326 extend in a chordwise direction along a chord line 330 and are opposed in a thickness direction normal to a mean camber line 328, which is illustrated as a dashed line in FIG. 6 that extends from the leading edge 306 to the trailing edge 308. The pressure side 324 and the suction side 326 extend from the leading edge 306 to the trailing edge 308. In one example, each of the airfoils 302 is somewhat asymmetrical and cambered along the mean camber line 328. The pressure side 324 has a contoured, generally concave surface geometry, which gently bends or curves in three dimensions. The suction side 326 has a contoured, generally convex surface geometry, which likewise bends or curves in three dimensions. In other embodiments, the airfoils 302 may not be cambered and may be either symmetrical or asymmetrical.

In one example, each of the airfoils 302 has an inlet blade angle $\beta 1$ defined at the leading edge 306. The inlet blade angle $\beta 1$ is the angle between a reference line L1 that is tangent to the mean camber line 328 at the leading edge 306 and a reference line L2 that is parallel to the engine center line or the longitudinal axis 140 of the gas turbine engine 100 (FIG. 5) and normal to the direction of rotation DR. Each of the airfoils 302 also have an exit blade angle $\beta 2$ defined at the trailing edge 308. The exit blade angle $\beta 2$ is the angle between a reference line L3 that is tangent to the mean camber line 328 at the trailing edge 308 and a reference line L4 that is parallel to the engine center line or the longitudinal axis 140 of the gas turbine engine 100 (FIG. 5) and normal to the direction of rotation DR. Generally, for a particular span of the airfoil 302, each of the airfoils 302 have a respective inlet blade angle $\beta 1$ and exit blade angle $\beta 2$. In addition, for a particular span of the airfoil 302, each of the airfoils 302 have a respective delta inlet blade angle $\beta 1$, which is defined by the following equation:

$$\text{Delta } \beta 1 = \text{Local } \beta 1 - \text{Root } \beta 1 \qquad (2)$$

Wherein Delta $\beta 1$ is the delta inlet blade angle $\beta 1$ for the particular spanwise location; Local $\beta 1$ is the inlet blade angle $\beta 1$ for the particular spanwise location; and Root $\beta 1$ is the inlet blade angle $\beta 1$ at the hub, root 210 or 0% span of the airfoil 302. In one example, the root inlet blade angle $\beta 1$ is about 40 to about 50 degrees. In one example, the delta inlet blade angle $\beta 1$ for each of the airfoils 302 varies over the span S of the airfoil 302 based on a delta inlet blade angle distribution 340 of the airfoil 302 (FIG. 7).

Figure 7:
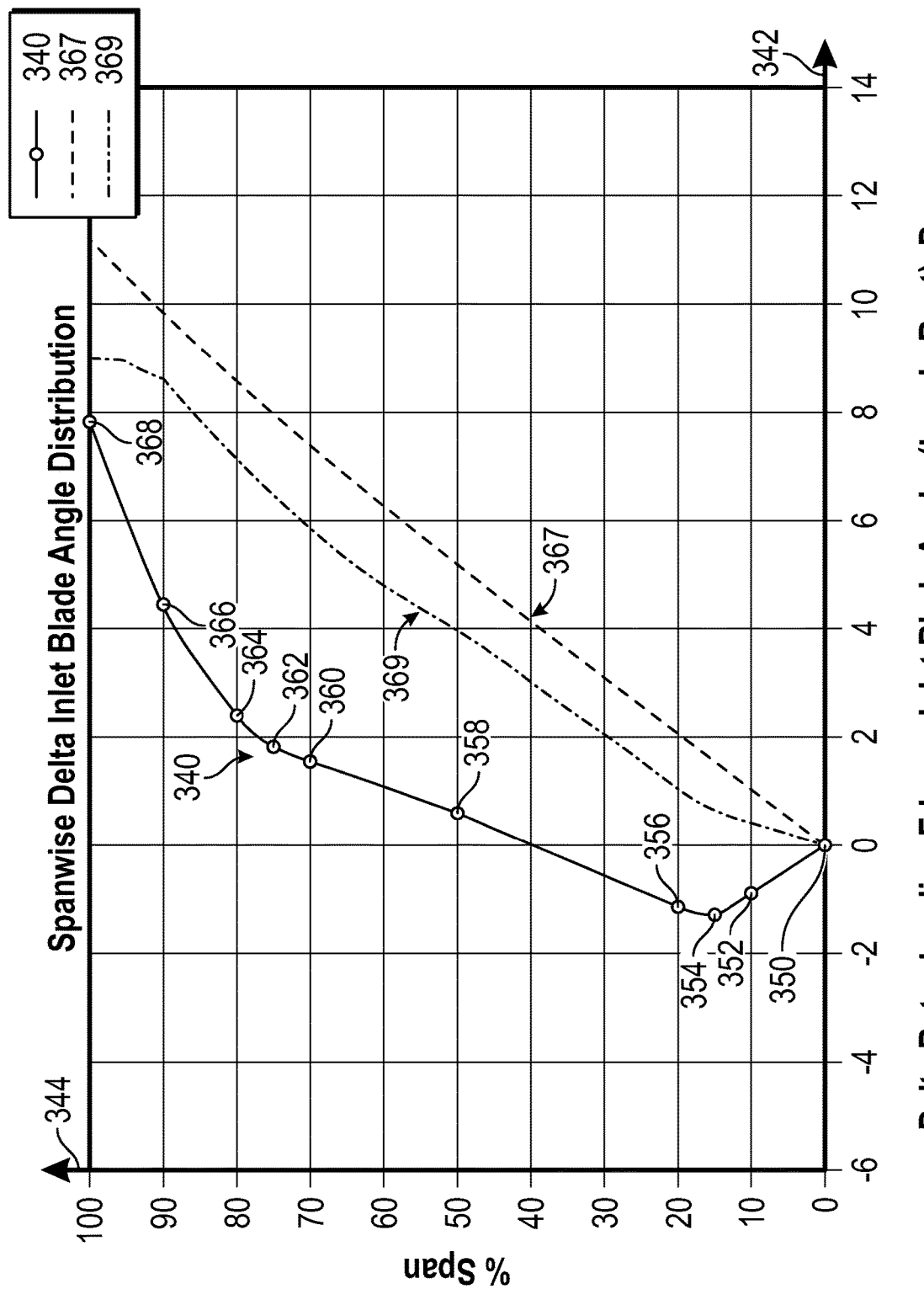
FIG. 7 is a graph of a value of a delta inlet blade angle (delta inlet blade angle; abscissa) associated with the rotor blade versus a percent span (ordinate) illustrating a spanwise delta inlet blade angle distribution associated with the rotor blade of FIG. 5.

In one example, with reference to FIG. 7, a graph shows the delta inlet blade angle distribution 340 along the span of each of the airfoils 302. In FIG. 7, the abscissa or horizontal axis 342 is the delta inlet blade angle $\beta 1$ defined by equation (2); and the ordinate or vertical axis 344 is the spanwise location or location along the span of each of the airfoils 302 (span is 0% at the root 310 (FIG. 5) and span is 100% at the tip 312 (FIG. 5)). In one example, the delta inlet blade angle $\beta 1$ ranges from about −1.5 to 8 degrees.

As shown in FIG. 7, at 0% span, the delta inlet blade angle $\beta 1$ has a first value 350. From 0% span, the value of the delta inlet blade angle $\beta 1$ decreases to 10% span. At 10% span, the delta inlet blade angle $\beta 1$ has a second value 352, which is different and less than the first value 350. From 10% span, the value of the delta inlet blade angle $\beta 1$ decreases to a minimum value 354. In one example, the minimum value 354 is an absolute minimum value for the delta inlet blade angle $\beta 1$ over the span of the airfoil 302, and is defined between 10% and 20% span. In this example, the minimum value 354 is defined at about 15% span. Thus, the value of the delta inlet blade angle $\beta 1$ decreases from the root 310 (0% span) to the minimum value 354, which is defined at greater than 10% span. At 20% span, the delta inlet blade angle $\beta 1$ has a third value 356. The third value 356 is greater than the minimum value 354. Thus, the delta inlet blade angle $\beta 1$ increases from the minimum value 354 to 20% span.

At 50% span, the delta inlet blade angle $\beta 1$ has a fourth value 358. The fourth value 358 is different and greater than the third value 356, the minimum value 354, the second value 352 and the first value 350. Thus, the value of the delta inlet blade angle $\beta 1$ increases from the minimum value 354 to 50% span. In one example, the value of the delta inlet blade angle $\beta 1$ increases monotonically. At 70% span, the delta inlet blade angle $\beta 1$ has a fifth value 360. The fifth value 360 is different and greater than the fourth value 358, the third value 356, the minimum value 354, the second value 352 and the first value 350. Thus, the value of the delta inlet blade angle $\beta 1$ increases from the minimum value 354 to 70% span. In one example, the value of the delta inlet blade angle $\beta 1$ increases monotonically from the minimum value 354 to 70% span.

At about 75% span, the delta inlet blade angle $\beta 1$ has a sixth value 362. The sixth value 362 is different and greater than the fifth value 360, the fourth value 358, the third value 356, the minimum value 354, the second value 352 and the first value 350. Thus, the value of the delta inlet blade angle $\beta 1$ increases from the minimum value 354 to 75% span. In one example, the value of the delta inlet blade angle $\beta 1$ increases monotonically from the minimum value 354 to 75% span. From about 75% span to the tip 312 (FIG. 5) or 100% span, the value of the delta inlet blade angle $\beta 1$ increases. At 80% span, the delta inlet blade angle $\beta 1$ has a seventh value 364. The seventh value 364 is different and greater than the sixth value 362, the fifth value 360, the fourth value 358, the third value 356, the minimum value 354, the second value 352 and the first value 350. Thus, the value of the delta inlet blade angle $\beta 1$ increases from the minimum value 354 to 80% span.

At 90% span, the delta inlet blade angle $\beta 1$ has an eighth value 366. The eighth value 366 is different and greater than the seventh value 364, the sixth value 362, the fifth value 360, the fourth value 358, the third value 356, the minimum value 354, the second value 352 and the first value 350. Thus, the value of the delta inlet blade angle $\beta 1$ increases from the minimum value 354 to 90% span. At 100% span, the delta inlet blade angle $\beta 1$ has a ninth value 368. The ninth value 368 is different and greater than the eighth value 366, the seventh value 364, the sixth value 362, the fifth value 360, the fourth value 358, the third value 356, the minimum value 354, the second value 352 and the first value 350. Thus, the value of the delta inlet blade angle $\beta 1$ increases from the minimum value 354 to the tip 312 (FIG. 5) or 100% span. The ninth value 368 is an absolute maximum value for the delta inlet blade angle $\beta 1$ over the span of the airfoil 302. Thus, each of the airfoils 302 has the delta inlet blade angle distribution 340, in which the value of the delta inlet blade angle β1 decreases from the root 310 (FIG. 5) at 0% span to the minimum value 354 defined between 10% and 20% span, and increases from the minimum value 354 to the tip 312 (FIG. 5) at 100% span in contrast to conventional delta inlet blade angle distributions 367 and 369.

With reference back to FIG. 6, each one of the airfoils 302 also has a plurality of chord lines 330, with each of the plurality of chord lines 330 defined at a particular spanwise location of the airfoil 302. The plurality of chord lines 330 are spaced apart from 0% span at the root 310 to 100% span at the tip 312, with the direction from the root 310 (0% span) to the tip 312 (100%) considered the spanwise direction. In this example, each of the plurality of chord lines 330 has an associated stagger angle γ. The stagger angle γ is defined as an angle formed between the particular chord line 330 and a fifth reference line L5 that is tangent to the chord line 330 and parallel to the engine centerline or longitudinal axis 140. For a particular span of the airfoil 302, each of the airfoils 302 have a respective delta stagger angle γ, which is defined by the following equation:

$$\text{Delta } \gamma = \text{Local } \gamma - \text{Root } \gamma \tag{3}$$

Wherein Delta γ is the delta stagger angle γ for the particular spanwise location; Local γ is the stagger angle γ for the particular spanwise location; and Root γ is the stagger angle γ at the hub, root 310 or 0% span of the airfoil 302. In one example, the root stagger angle γ is about 22 to about 33 degrees. In one example, the delta stagger angle γ for each of the airfoils 302 varies over the span S of the airfoil 302 based on a delta stagger angle distribution 370 of the airfoil 302 (FIG. 8).

Figure 8:
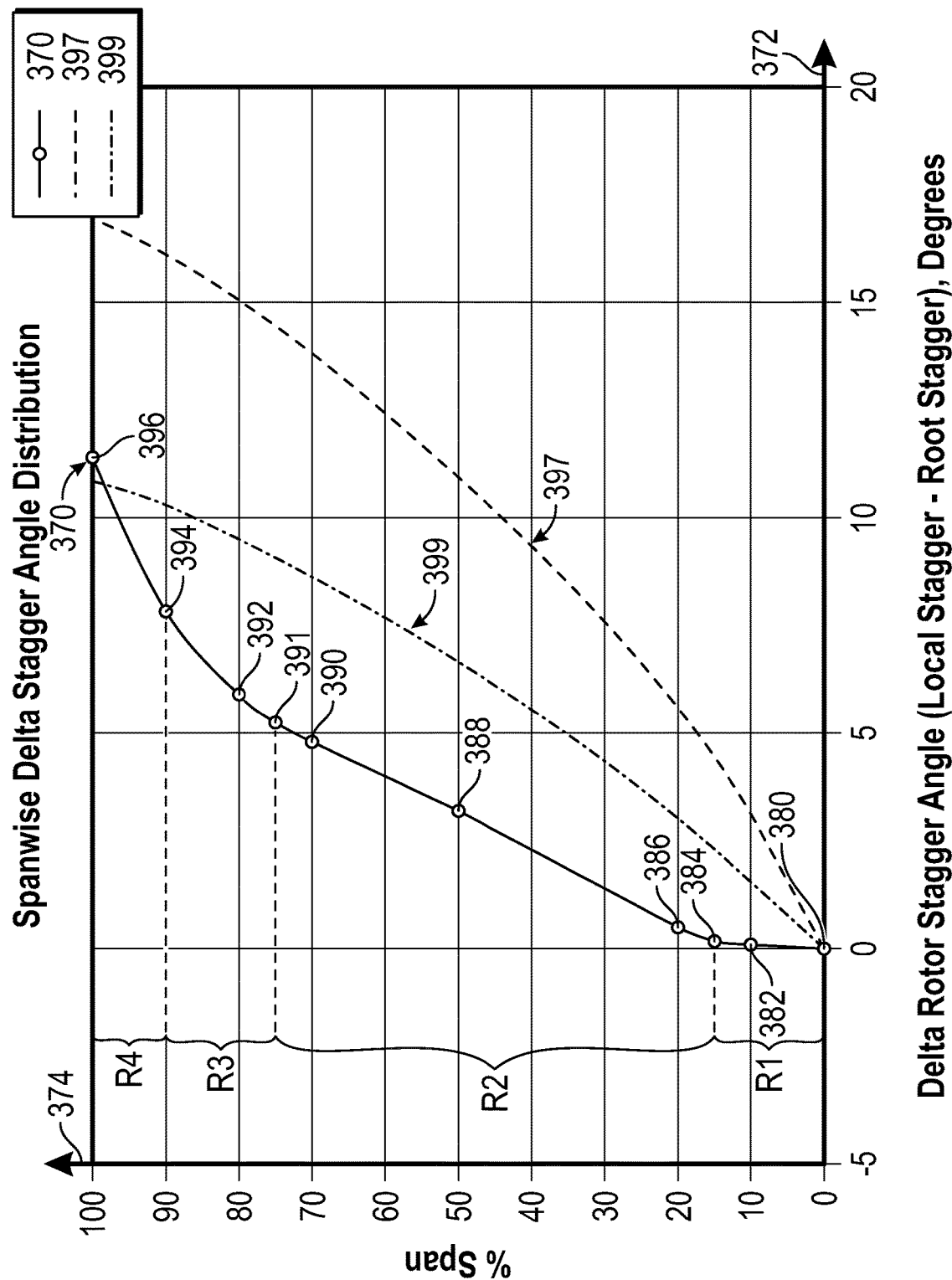
FIG. 8 is a graph of a value of a delta stagger angle (delta stagger angle; abscissa) associated with the rotor blade versus a percent span (ordinate) illustrating a spanwise delta stagger angle distribution associated with the rotor blade of FIG. 5.

In one example, with reference to FIG. 8, a graph shows the delta stagger angle distribution 370 along the span of each of the airfoils 302. In FIG. 8, the abscissa or horizontal axis 372 is the delta stagger angle γ defined by equation (3); and the ordinate or vertical axis 374 is the spanwise location or location along the span of each of the airfoils 302 (span is 0% at the root 310 (FIG. 5) and span is 100% at the tip 312 (FIG. 5)). In one example, the delta stagger angle γ ranges from about 0 to 12 degrees.

As shown in FIG. 8, at 0% span, the delta stagger angle γ has a first value 380. From 0% span, the value of delta stagger angle γ remains substantially constant or is about the same to 10% span. At 10% span, the delta stagger angle γ has a second value 382, which is substantially the same as the first value 380. Thus, a first rate of change R1 of the delta stagger angle γ is at a minimum from 0% span to 10% span. From 10% span, the value of the delta stagger angle γ remains substantially constant or is about the same to a third value 384. The third value 384 is defined between 10% span and 20% span, and in one example, is about 15% span. From the third value 384, the value of the delta stagger angle γ increases to 20% span. At 20% span, the delta stagger angle γ has a fourth value 386. The fourth value 386 is greater than the third value 384.

At 50% span, the delta stagger angle γ has a fifth value 388. The fifth value 388 is different and greater than the fourth value 386, the third value 384, the second value 382 and the first value 380. At 70% span, the delta stagger angle γ has a sixth value 390. The sixth value 390 is different and greater than the fifth value 388, the fourth value 386, the third value 384, the second value 382 and the first value 380. The value of the delta stagger angle γ increases from the root 310 (FIG. 5) at 0% span to 70% span. In one example, the value of the delta stagger angle γ increases monotonically from the third value 384 to 70% span. Thus, a second rate of change R2 of the delta stagger angle γ between about 15% span and 75% span is different and greater than the first rate of change R1 of the value of the delta stagger angle γ between 0% span and 15% span.

At 75% span, the delta stagger angle γ has a seventh value 391. The seventh value 391 is different and greater than the sixth value 390, the fifth value 388, the fourth value 386, the third value 384, the second value 382 and the first value 380. Thus, the value of the delta stagger angle γ increases from the root 310 (FIG. 5) at 0% span to 75% span. In one example, the value of the delta stagger angle γ increases monotonically from the third value 384 to the seventh value 391 at 75% span. At 80% span, the delta stagger angle γ has an eighth value 392. The eighth value 392 is different and greater than the seventh value 391, the sixth value 390, the fifth value 388, the fourth value 386, the third value 384, the second value 382 and the first value 380. Thus, the value of the delta stagger angle γ increases from the root 310 (FIG. 5) at 0% span to 80% span. In one example, the value of the delta stagger angle γ increases from the seventh value 391 to the eighth value 392.

At 90% span, the delta stagger angle γ has a ninth value 394. The ninth value 394 is different and greater than the eighth value 392, the seventh value 391, the sixth value 390, the fifth value 388, the fourth value 386, the third value 384, the second value 382 and the first value 380. Thus, the value of the delta stagger angle γ increases from the root 310 (FIG. 5) at 0% span to 90% span. In one example, the value of the delta stagger angle γ increases from the seventh value 391 to the ninth value 394. A third rate of change R3 of the delta stagger angle γ between about 75% span and 90% span is different and greater than the second rate of change R2 of the delta stagger angle γ between about 15% span and 75% span and the first rate of change R1 of the value of the delta stagger angle γ between 0% span and 15% span.

At 100% span, the delta stagger angle γ has a tenth value 396. The tenth value 396 is different and greater than the ninth value 394, the eighth value 392, the seventh value 391, the sixth value 390, the fifth value 388, the fourth value 386, the third value 384, the second value 382 and the first value 380. Thus, the value of the delta stagger angle γ increases from the root 310 (FIG. 5) at 0% span to the tip 312 (FIG. 5) at 100% span. In one example, the value of the delta stagger angle γ increases from the ninth value 394 to the tip 312 (FIG. 5) at 100% span. The tenth value 396 is an absolute maximum value for the delta stagger angle γ over the span of the airfoil 302. A fourth rate of change R4 of the delta stagger angle γ between about 90% span and 100% span is different and greater than the third rate of change R3 of the delta stagger angle γ between about 75% span and 90% span; the second rate of change R2 of the delta stagger angle γ between about 15% span and 70% span; and the first rate of change R1 of the value of the delta stagger angle γ between 0% span and 15% span.

Thus, the fourth rate of change R4 is a maximum rate of change of the value of the delta stagger angle γ, which is proximate the tip 312 between 90% and 100% span, while the first rate of change R1 is a minimum rate of change of the value of the delta stagger angle γ, which is proximate the root 310 (FIG. 5) between 0% and 15% span in contrast to conventional delta stagger angle distributions 397 and 399. In one example, the first rate of change R1 is about 0.01 degrees/percent span to 0.02 degrees/percent span, while the rate of change R4 is about 0.35 degrees/percent span to about 0.40 degrees/percent span. Thus, in one example, the fourth rate of change R4 is an absolute maximum value for the rate of change of the value of the delta stagger angle γ over the span of the airfoil 302, and is defined between 90% and 100% span; and the first rate of change R1 is an absolute minimum value for the rate of change of the value of the delta stagger angle γ over the span of the airfoil 302, and is defined between 0% and 15% span. Generally, the slope or the first rate of change R1 of the value of the delta stagger angle γ proximate the root 310 (FIG. 5) at 0% span is about 30 times less than the slope or the fourth rate of change R4 proximate the tip 312 (FIG. %) at 100% span. In this example, the second rate of change R2, which is between 15% and 75% span, is about 0.08 degrees/percent span to 0.09 degrees/percent span; and the third rate of change R3, which is between 75% and 90% span, is about 0.17 degrees/percent span to 0.18 degrees/percent span.

In one example, with reference back to FIG. 5, each of the airfoils 302 also includes an inlet hub radius $R_H$ and an inlet tip radius $R_T$. The inlet hub radius $R_H$ is a radius from the gas turbine centerline or longitudinal axis 140 to the hub or root 310 of the airfoil 302 at the leading edge 306. The inlet tip radius $R_T$ is a radius from the gas turbine centerline or longitudinal axis 140 to the tip 312 of the airfoil 302 at the leading edge 306. For each of the airfoils 302, the airfoil 302 has an inlet hub-to-tip radius ratio ($R_H/R_T$) that is greater than 0.7. The relatively large hub-to-tip radius ratio helps differentiate the booster rotor 200 from other axial rotors such as fans and axial compressors With the airfoils 302 formed, the airfoils 302 are coupled to the rotor hub 222 to form the booster rotor 200. As discussed, each of the airfoils 302 include a characteristic distribution, in this example, the delta inlet blade angle distribution 340 shown in FIG. 7 and/or the delta stagger angle distribution 370 shown in FIG. 8, which improves management of endwall aerodynamic loading that also results in increased efficiency and stability of the booster rotor 200. With reference to FIG. 7, the value of the delta inlet blade angle β1 decreases in the spanwise direction from the root 310 at 0% span to a minimum value at greater than 10% span in the spanwise direction and from the minimum value, the delta inlet blade angle β1 increases to the tip 312 at 100% span. With reference to FIG. 8, the rate of change of the delta stagger angle γ in the spanwise direction is at a minimum at the root at 0% span (the first rate of change R1) and is at a maximum at the tip 312 at 100% span (the fourth rate of change R4).

As discussed, the booster rotor 200 may be incorporated into the fan section described with regard to FIG. 1 above. For example, and additionally referring to FIGS. 1 and 5, the booster rotor 200 is installed downstream of the fan rotor 112 and fan core stator 154 and is driven by the shaft 124 either directly or indirectly coupled to the fan rotor 112, such that as the fan rotor 112 rotates, the booster rotor 200 rotates at the same speed as the fan rotor 112 to compress the air flowing through the airfoils 302 prior to reaching the compressors 118.

Normalized Local Maximum Thickness Distribution

It should be noted that the plurality of rotor blades 202 may be configured differently to improve robustness of the booster rotor 200. For example, with reference to FIG. 9, a rotor blade 402 for use with the booster rotor 200 of the gas turbine engine 100 is shown. As the rotor blade 402 includes the same or similar components as the rotor blade 202 discussed with regard to FIGS. 1-4, the same reference numerals will be used to denote the same or similar components.

Figure 9:
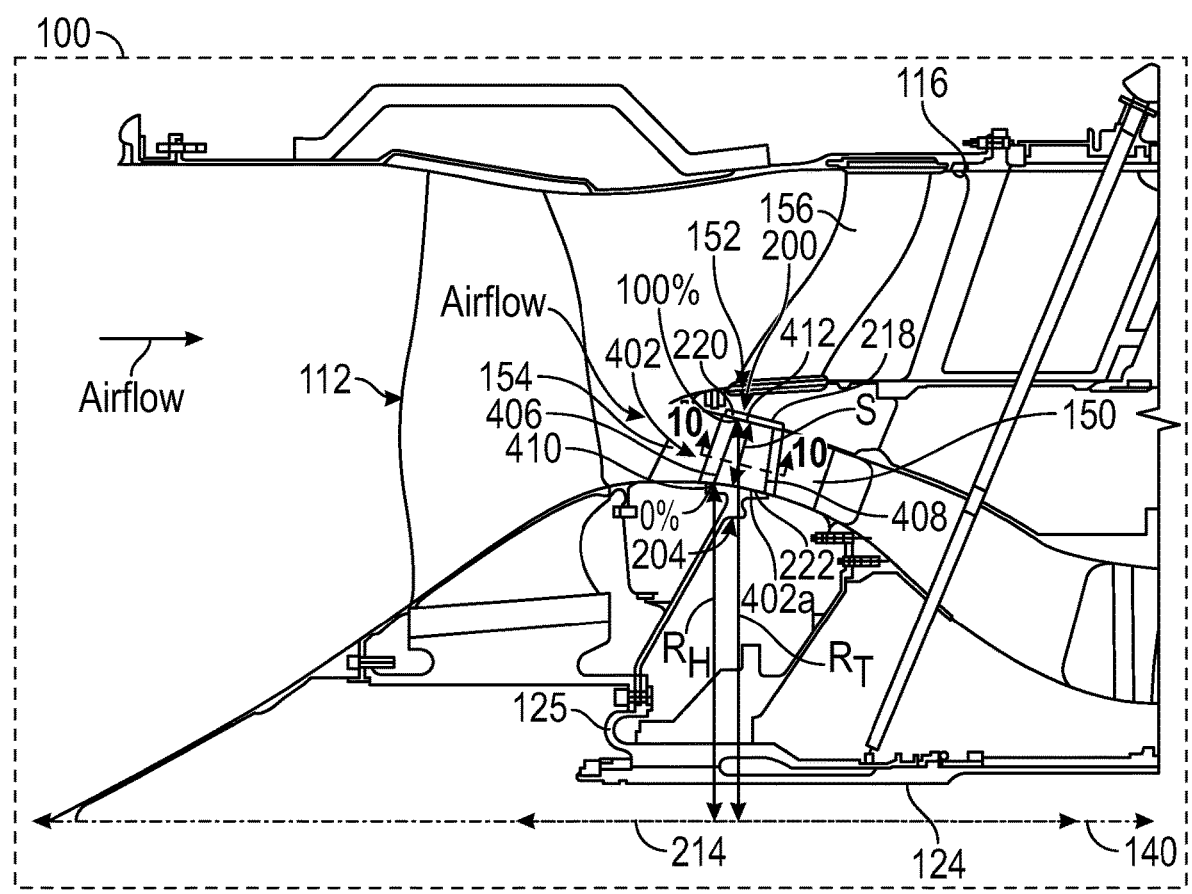
FIG. 9 is a detail cross-sectional view of the booster rotor and rotor blade of FIG. 1, taken at 2 of FIG. 1, in which the rotor blade has a normalized local maximum thickness distribution in accordance with the various embodiments of the present disclosure.

For ease of illustration, one of the plurality of rotor blades 402 for use with the booster rotor 200 of the gas turbine engine 100 is shown in FIG. 9. It should be noted that while a single rotor blade 402 is shown in FIG. 9, the booster rotor 200 includes a plurality of the rotor blades 402, which are spaced apart about a perimeter or circumference of the rotor disk 204. Each of the rotor blades 402 may be referred to as an "airfoil 402." Each airfoil 402 extends in a radial direction (relative to the longitudinal axis 140 of the gas turbine engine 100) about the periphery of the rotor disk 204. The airfoils 402 each include a leading edge 406, an axially-opposed trailing edge 408, a base or root 410, and a radially-opposed tip 412. The tip 412 is spaced from the root 410 in a blade height, span or spanwise direction, which generally corresponds to the radial direction or R-axis of the coordinate legend 211 in the view of FIG. 9. The booster rotor 200 includes multiple airfoils 402 which are spaced about the rotor rotational axis 214.

The span S of each of the airfoils 402 is 0% at the root 410 (where the airfoil 402 is coupled to the rotor hub 222 of the rotor disk 204) and is 100% at the tip 412. In this example, the airfoils 402 are arranged in a ring or annular array surrounded by the annular housing piece 218, which defines the pocket 220. The airfoils 402 and the rotor disk 204 are generally composed of a metal, metal alloy or a polymer-based material, such as a polymer-based composite material. In one example, the airfoils 402 are integrally formed with the rotor disk 204 as a monolithic or single piece structure commonly referred to as a bladed disk or "blisk." In other examples, the airfoils 402 may be insert-type blades, which are received in mating slots provided around the outer periphery of rotor disk 204. In still further examples, the booster rotor 200 may have a different construction. Generally, then, it should be understood that the booster rotor 200 is provided by way of non-limiting example and that the booster rotor 200 (and the airfoils 402 described herein) may be fabricated utilizing various different manufacturing approaches. Such approaches may include, but are not limited to, casting and machining, three dimensional metal printing processes, direct metal laser sintering, Computer Numerical Control (CNC) milling of a preform or blank, investment casting, electron beam melting, binder jet printing, powder metallurgy and ply lay-up, to list but a few examples. The booster hub flow path is the outer surface of the rotor disk 204 and extends between the airfoils 402 to guide airflow along from the inlet end (leading edge) to the outlet end (trailing edge) of the booster rotor 200.

As shown in FIG. 9, each of the plurality of airfoils 402 is coupled to the rotor hub 222 at the root 410 (0% span). It should be noted that while each of the plurality of airfoils 402 are illustrated herein as being coupled to the rotor hub 222 with a fillet 402a that defines a curvature relative to the axial direction (X-axis), one or more of the plurality of airfoils 402 may be coupled to the rotor hub 222 with a fillet 402a along a straight line. Further, it should be noted that one or more of the plurality of airfoils 402 may be coupled to the rotor hub 222 along a complex curved surface. It should be noted that in the instances where the plurality of airfoils 402 are coupled to the rotor hub 222 at an angle with the fillet 402a, the span remains at 0% at the root 410. In other words, the span of each of the plurality of airfoils 402 remains at 0% at the root 410 regardless of the shape of the fillet 402a.

Figure 10:
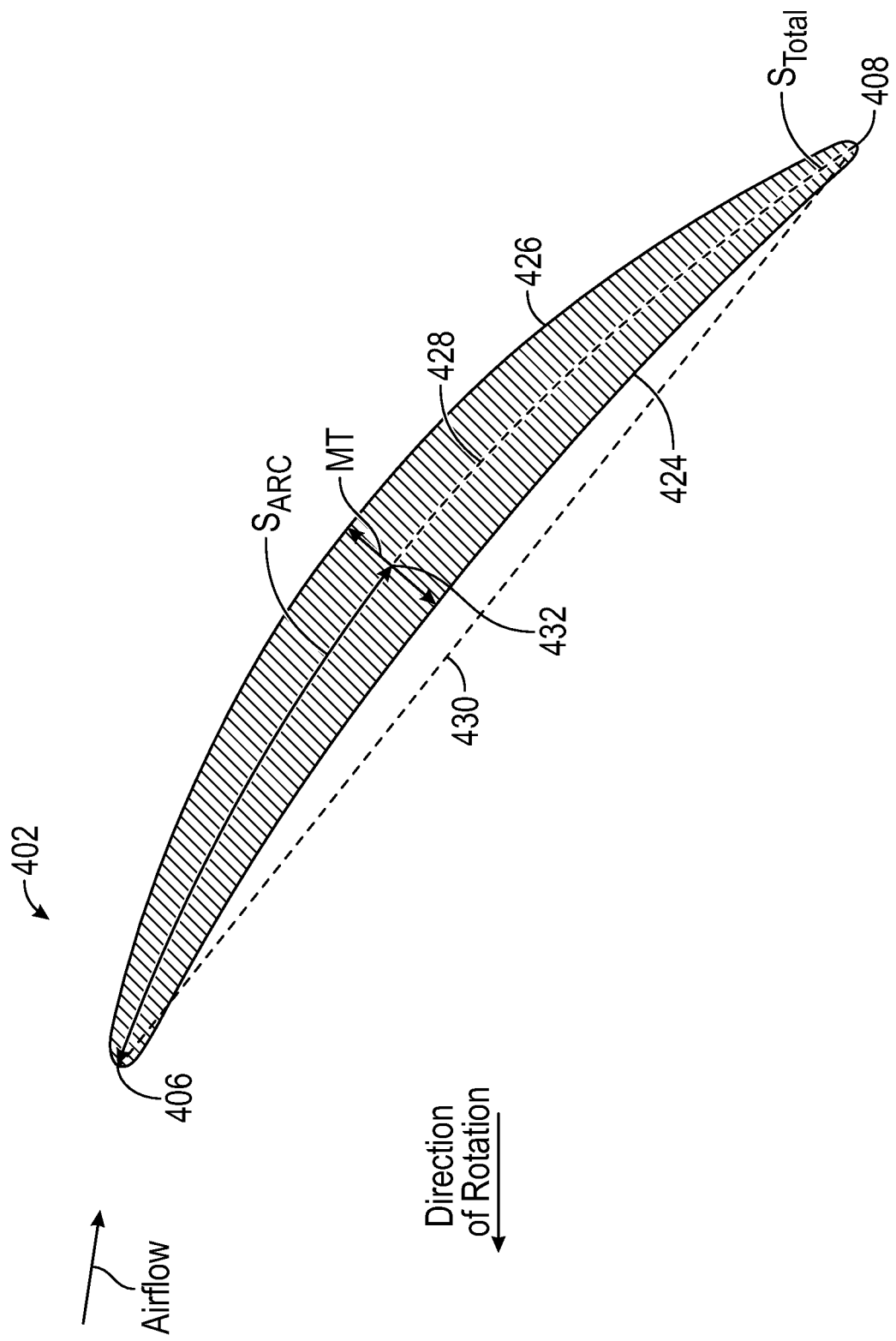
FIG. 10 is a cross-sectional view of the rotor blade of FIG. 9, taken along line 10-10 of FIG. 9.

With reference to FIG. 10, each of the airfoils 402 further includes a first principal face or a "pressure side" 424 and the second, opposing face or a "suction side" 426. The pressure side 424 and the suction side 426 extend in a chordwise direction along a chord line 430 and are opposed in a thickness direction normal to a mean camber line 428, which is illustrated as a dashed line in FIG. 10 that extends from the leading edge 406 to the trailing edge 408. The pressure side 424 and the suction side 426 extend from the leading edge 406 to the trailing edge 408. In one example, each of the airfoils 402 is somewhat asymmetrical and cambered along the mean camber line 428. The pressure side 424 has a contoured, generally concave surface geometry, which gently bends or curves in three dimensions. The suction side 426 has a contoured, generally convex surface geometry, which likewise bends or curves in three dimensions. In other embodiments, the airfoils 402 may not be cambered and may be either symmetrical or asymmetrical.

In one example, at each spanwise location along the span S of each of the airfoils 402, each of the airfoils 402 has a total length or total arc distance $S_{Total}$ defined from the leading edge 406 to the trailing edge 408 along the mean camber line 428. In addition, at each spanwise location along the span S of each of the airfoils 402, each of the airfoils 402 has a first length or first arc distance $S_{Arc}$, which is defined as the arc distance along the mean camber line 428 from the leading edge 406 to a position 432 of local maximum thickness MT for the particular span S. Stated another way, for each spanwise location along the span S of the airfoils 402, the airfoil 402 has a position 432 or location of local maximum thickness LMT, which is defined as a ratio of the first arc distance $S_{Arc}$ along the mean camber line 428 associated with the respective spanwise location between the leading edge 406 and the location of the local maximum thickness LMT to the total arc distance $S_{Total}$ along the respective mean camber line 428 from the leading edge 406 to the trailing edge 408, or:

$$LMT = \frac{S_{Arc}}{S_{Total}} \quad (4)$$

Wherein, LMT is the location of local maximum thickness for the particular spanwise location of the airfoil 402; $S_{Arc}$ is the first arc distance defined along the mean camber line 428 between the leading edge 406 and the position 432 (FIG. 10) of the local maximum thickness MT for the particular spanwise location of the airfoil 402; and $S_{Total}$ is total arc distance along the mean camber line 428 from the leading edge 406 to the trailing edge 408 for the particular spanwise location of the airfoil 402. The local maximum thickness MT is the greatest distance between the pressure side 424 and the suction side 426 that is normal to the mean camber line 428 for the particular spanwise location. In this example, the location of local maximum thickness (LMT) is less than or equal to about 0.45 across the entire span of the airfoil 402 (from 0% span at the root 410 to 100% span at the tip 412). In addition, for a particular span of the airfoil 402, each of the airfoils 402 have a respective normalized local maximum thickness MT, which is defined by the following equation:

$$\text{Normalized } MT = \frac{\text{Local } MT}{\text{Root } MT} \quad (5)$$

Wherein Normalized MT is the normalized local maximum thickness MT for the particular spanwise location; Local MT is the local maximum thickness MT for the particular spanwise location; and Root MT is the local maximum thickness MT at the hub, root 410 or 0% span of the airfoil 402. In one example, the root MT is about 0.13 to about 0.19 inches. In one example, the normalized local maximum thickness MT for each of the airfoils 402 varies over the span S based on a normalized local maximum thickness distribution 440 of the airfoil 402 (FIG. 11).

Figure 11:
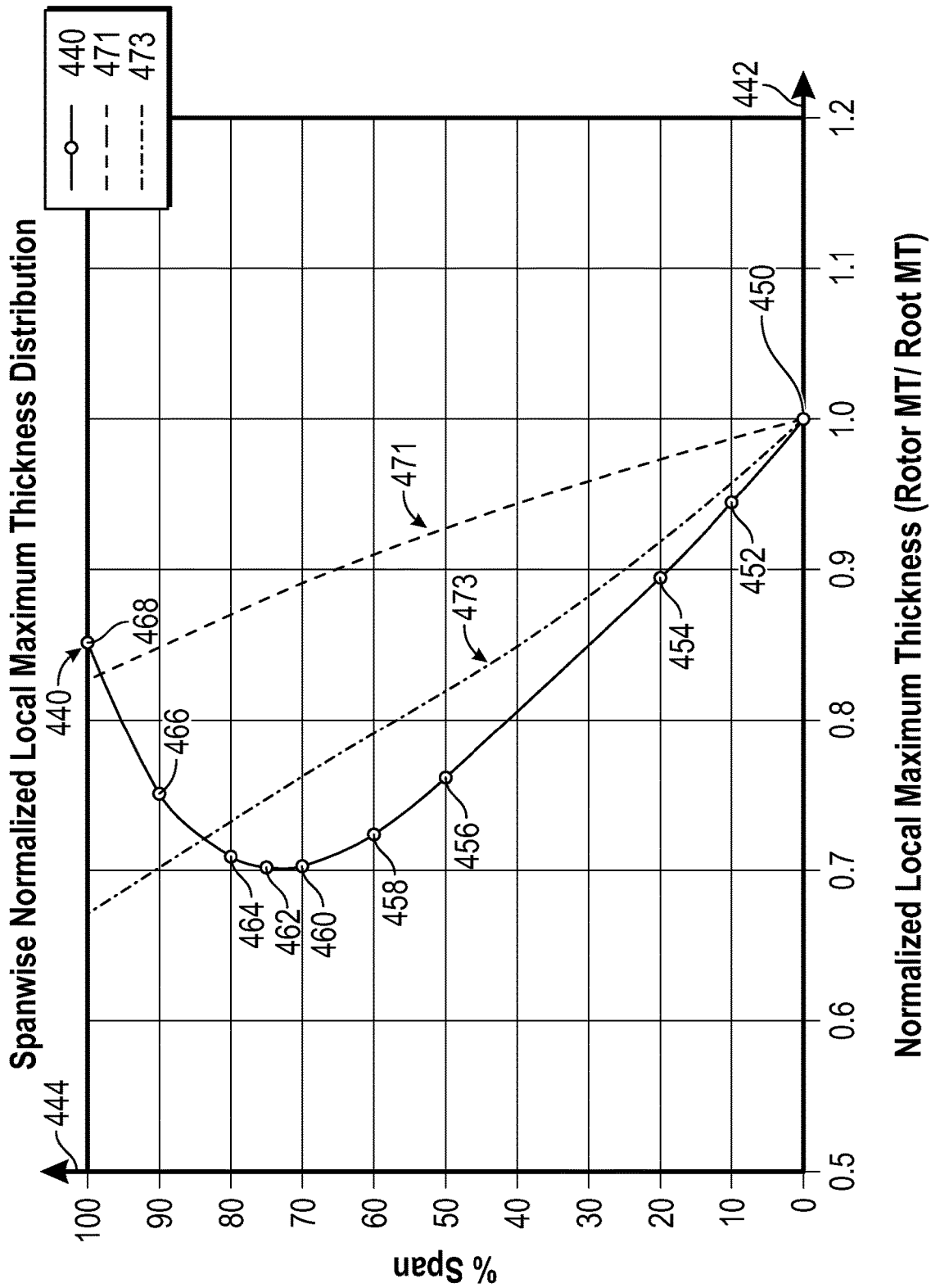
FIG. 11 is a graph of a value of a normalized local maximum thickness (normalized local maximum thickness; abscissa) associated with the rotor blade versus a percent span (ordinate) illustrating a spanwise normalized local maximum thickness distribution associated with the rotor blade of FIG. 9.

In one example, with reference to FIG. 11, a graph shows the normalized local maximum thickness distribution 440 along the span of each of the airfoils 402. In FIG. 11, the abscissa or horizontal axis 442 is a value of the normalized local maximum thickness MT defined by equation (5); and the ordinate or vertical axis 444 is the spanwise location or location along the span of each of the airfoils 402 (span is 0% at the root 410 (FIG. 9) and span is 100% at the tip 412 (FIG. 9)). In one example, the normalized local maximum thickness MT ranges from about 0.7 to 1.0.

As shown in FIG. 11, at 0% span, the normalized local maximum thickness MT has a first value 450. The first value 450 is an absolute maximum value for the normalized local maximum thickness over the span of the airfoil 402. From 0% span, the value of the normalized local maximum thickness MT decreases to 10% span. At 10% span, the normalized local maximum thickness MT has a second value 452, which is different and less than the first value 450. From 10% span, the value of the normalized local maximum thickness MT decreases to a third value 454 at 20% span. In one example, the value of the normalized local maximum thickness MT decreases from the root 410 (FIG. 9) at 0% span monotonically to the third value 454 at 20% span. At 50% span, the normalized local maximum thickness MT has a fourth value 456. The fourth value 456 is different and less than the third value 454. Thus, the normalized local maximum thickness MT decreases from the root 410 (FIG. 9) at 0% span to 50% span. In one example, the value of the normalized local maximum thickness MT decreases monotonically.

At 60% span, the normalized local maximum thickness MT has a fifth value 458. The fifth value 458 is different and less than the fourth value 456, the third value 454, the second value 452 and the first value 450. Thus, the value of the normalized local maximum thickness MT decreases from the root 410 (FIG. 9) at 0% span to 60% span. At 70% span, the normalized local maximum thickness MT has a sixth value 460. The sixth value 460 is different and less than the fifth value 458, the fourth value 456, the third value 454, the second value 452 and the first value 450. Thus, the value of the normalized local maximum thickness MT decreases from the root 410 (FIG. 9) at 0% span to 70% span.

At about 75% span, the normalized local maximum thickness MT has a minimum value 462. The minimum value 462 is different and less than the sixth value 460, the fifth value 458, the fourth value 456, the third value 454, the second value 452 and the first value 450. Thus, the value of the normalized local maximum thickness MT decreases from the root 410 (FIG. 9) at 0% span to 75% span. In one example, the minimum value 462 is an absolute minimum value for the normalized local maximum thickness MT over the span of the airfoil 402, and is defined between 60% and 90% span. In this example, the minimum value 462 is defined at about 75% span.

From about 75% span to the tip 412 (FIG. 9) or 100% span, the value of the normalized local maximum thickness MT increases. At 80% span, the normalized local maximum thickness MT has a seventh value 464. The seventh value 464 is different and greater than the minimum value 462 and the sixth value 460. The seventh value 464 is different and less than the fifth value 458, the fourth value 456, the third value 454, the second value 452 and the first value 450.

Thus, the value of the normalized local maximum thickness MT increases from the minimum value 462 to 80% span.

At 90% span, the normalized local maximum thickness MT has an eighth value 466. The eighth value 466 is different and greater than the seventh value 464, the minimum value 462 and the sixth value 460. The eighth value 466 is different and less than the third value 454, the second value 452 and the first value 450. In one example, the eighth value 466 is about the same as the fourth value 456. The value of the normalized local maximum thickness MT increases from the minimum value 462 to 90% span. At 100% span, the normalized local maximum thickness MT has a ninth value 468. The ninth value 468 is different and greater than the eighth value 466, the seventh value 464, the minimum value 462, the sixth value 460, the fifth value 458 and the fourth value 456. The ninth value 468 is different and less than the third value 454, the second value 452 and the first value 450. Thus, the value of the normalized local maximum thickness MT increases from the minimum value 462 to the tip 412 (FIG. 9) or 100% span, and the value of the normalized local maximum thickness MT at the tip 412 is less than the value of the normalized local maximum thickness MT at the root 410 (FIG. 9). Thus, each of the airfoils 402 has the normalized local maximum thickness distribution 440, in which the value of the normalized local maximum thickness MT decreases from the root 410 (FIG. 9) at 0% span to the minimum value 462 defined between 60% and 90% span, and in one example, between 70% span to 80% span, and increases from the minimum value 462 to the tip 412 (FIG. 9) at 100% span in contrast to conventional normalized local maximum thickness distributions 471 and 473.

In one example, with reference back to FIG. 9, each of the airfoils 402 also includes an inlet hub radius $R_H$ and an inlet tip radius $R_T$. The inlet hub radius $R_H$ is a radius from the gas turbine centerline or longitudinal axis 140 to the hub or root 410 of the airfoil 402 at the leading edge 406. The inlet tip radius $R_T$ is a radius from the gas turbine centerline or longitudinal axis 140 to the tip 412 of the airfoil 402 at the leading edge 406. For each of the airfoils 402, the airfoil 402 has an inlet hub-to-tip radius ratio ($R_H/R_T$) that is greater than 0.7. The relatively large hub-to-tip radius ratio helps differentiate the booster rotor 200 from other axial rotors such as fans and axial compressors.

With the airfoils 402 formed, the airfoils 402 are coupled to the rotor hub 222 to form the booster rotor 200. As discussed, each of the airfoils 402 include a characteristic distribution, in this example, the normalized local maximum thickness distribution 440 shown in FIG. 11, which provides robustness to foreign object encounters without increasing a weight of the airfoil 402 or negatively impacting efficiency of the booster rotor 200. With reference to FIG. 11, the value of the normalized local maximum thickness MT decreases in the spanwise direction from the root 410 at 0% span (FIG. 9) to the minimum value 462 between 60% span to 90% span in the spanwise direction and from the minimum value 462, the value of the normalized local maximum thickness MT increases to the tip 412 (FIG. 9) at 100% span. This spanwise normalized distribution of local maximum thickness MT results in the booster rotor 200 being is more tolerant to foreign object encounters while maintaining high efficiency and robust vibratory characteristics. The local increase in thickness near the tip 412 (FIG. 9) provides a beneficial increase to stiffness of the airfoil 402 during operation in both the radial and chordwise directions and allows tolerance to foreign object encounters to be improved while reducing thickness throughout a majority of the span of the airfoil 402, thereby reducing weight and improving efficiency.

As discussed, the booster rotor 200 may be incorporated into the fan section described with regard to FIG. 1 above. For example, and additionally referring to FIGS. 1 and 9, the booster rotor 200 is installed downstream of the fan rotor 112 and fan core stator 154 and is driven by the shaft 124 either directly or indirectly coupled to the fan rotor 112, such that as the fan rotor 112 rotates, the booster rotor 200 rotates at the same speed as the fan rotor 112 to compress the air flowing through the airfoils 402 prior to reaching the compressors 118.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor for a turbofan booster section associated with a fan section of a gas turbine engine, the fan section including a fan driven by a shaft, the rotor downstream from the fan, and the rotor comprising:
   a rotor blade having an airfoil extending from a root to a tip and having a leading edge and a trailing edge, the rotor blade having an inlet hub-to-tip radius ratio that is greater than 0.7 at the leading edge, the airfoil having a plurality of chord lines spaced apart in a spanwise direction from 0% span at the root to 100% span at the tip, each chord line of the plurality of chords lines defined between the leading edge and the trailing edge and having a normalized chord value, and from the hub, the normalized chord value decreases to a minimum value between 20% to 90% span and increases from the minimum value to the tip; and
   a rotor disk coupled to the rotor blade configured to be coupled to the shaft or the fan to rotate with the shaft or the fan, respectively, at the same speed as the shaft and fan and to receive a portion of a fluid flow from the fan.

2. The rotor of claim 1, wherein the normalized chord value has an absolute maximum value at the root.

3. The rotor of claim 1, wherein between the minimum value and the tip, the normalized chord value has a second maximum value at the tip that is less than the absolute maximum value.

4. The rotor of claim 1, wherein the normalized chord value decreases monotonically to the minimum value from the hub.

5. The rotor of claim 1, wherein the minimum value is defined between 50% to 90% span.

6. The rotor of claim 1, wherein the minimum value is defined between 60% to 80% span.

7. The rotor of claim 1, wherein the minimum value is defined between 20% to 50% span.

8. The rotor of claim 1, wherein the normalized chord value has an absolute maximum value at the tip.

9. The rotor of claim 1, wherein the rotor disk is coupled to the fan to rotate with the fan, and the rotor disk is downstream from a fan core stator to receive the portion of the fluid flow from the fan.

10. A rotor for a turbofan booster section associated with a fan section of a gas turbine engine, the fan section including a fan driven by a shaft, the rotor downstream from the fan, and the rotor comprising:
   a rotor blade having an airfoil extending from a root to a tip and having a leading edge and a trailing edge, the rotor blade having an inlet hub-to-tip radius ratio that is greater than 0.7 at the leading edge, the airfoil having a plurality of chord lines spaced apart in a spanwise direction from 0% span at the root to 100% span at the tip, each chord line of the plurality of chords lines defined between the leading edge and the trailing edge and having a normalized chord value, and from the hub, the normalized chord value decreases to a minimum value between 20% to 90% span and increases from the minimum value to a second maximum value at the tip, with the normalized chord value having an absolute maximum value at the root that is greater than the second maximum value; and
   a rotor disk coupled to the rotor blade configured to be coupled to the shaft or the fan to rotate with the shaft or the fan, respectively, at the same speed as the shaft and fan and to receive a portion of a fluid flow from the fan.

11. The rotor of claim 10, wherein the normalized chord value decreases monotonically to the minimum value from the hub.

12. The rotor of claim 10, wherein the minimum value is defined between 50% to 90% span.

13. The rotor of claim 10, wherein the minimum value is defined between 60% to 80% span.

14. The rotor of claim 10, wherein the minimum value is defined between 20% to 50% span.

15. A rotor for a turbofan booster section associated with a fan section of a gas turbine engine, the fan section including a fan driven by a shaft, the rotor downstream from the fan, and the rotor comprising:
   a rotor blade having an airfoil extending from a root to a tip and having a leading edge and a trailing edge, the rotor blade having an inlet hub-to-tip radius ratio that is greater than 0.7 at the leading edge, the airfoil having a plurality of chord lines spaced apart in a spanwise direction from 0% span at the root to 100% span at the tip, each chord line of the plurality of chord lines defined between the leading edge and the trailing edge and having a normalized chord value, and from the hub, the normalized chord value decreases monotonically to a minimum value between 20% to 90% span and increases from the minimum value to a second maximum value at the tip, with the normalized chord value having an absolute maximum value at the root that is greater than the second maximum value; and
   a rotor disk coupled to the rotor blade configured to be coupled to the fan to rotate with the fan at the same speed as the fan and to receive a portion of a fluid flow from the fan.

16. The rotor of claim 15, wherein the minimum value is defined between 50% to 90% span.

17. The rotor of claim 15, wherein the minimum value is defined between 60% to 80% span.

* * * * *